US012469960B2

(12) United States Patent
Huang et al.

(10) Patent No.: US 12,469,960 B2
(45) Date of Patent: Nov. 11, 2025

(54) BASE STATION ANTENNAS

(71) Applicant: Outdoor Wireless Networks LLC, Claremont, NC (US)

(72) Inventors: Joy Huang, Plano, TX (US); Haifeng Li, Richardson, TX (US); Calvin Dickerson, Garland, TX (US)

(73) Assignee: Outdoor Wireless Networks LLC, Richardson, TX (US)

(*) Notice: Subject to any disclaimer, the term of this patent is extended or adjusted under 35 U.S.C. 154(b) by 245 days.

(21) Appl. No.: 18/324,532

(22) Filed: May 26, 2023

(65) Prior Publication Data

US 2024/0014545 A1 Jan. 11, 2024

Related U.S. Application Data

(60) Provisional application No. 63/359,304, filed on Jul. 8, 2022.

(51) Int. Cl.

*H01Q 1/24* (2006.01)
*H01Q 15/00* (2006.01)
*H01Q 15/14* (2006.01)
*H01Q 21/06* (2006.01)

(52) U.S. Cl.

CPC ......... *H01Q 1/246* (2013.01); *H01Q 15/0013* (2013.01); *H01Q 15/14* (2013.01); *H01Q 21/062* (2013.01)

(58) Field of Classification Search

CPC ............................ H01Q 1/246; H01Q 21/062
See application file for complete search history.

(56) References Cited

U.S. PATENT DOCUMENTS

| | | | |
|---|---|---|---|
| 5,184,145 | A | 2/1993 | Devillers et al. |
| 5,451,969 | A | 9/1995 | Toth et al. |
| 5,982,339 | A | 11/1999 | Alezari et al. |
| 6,025,812 | A | 2/2000 | Gabriel et al. |
| 6,339,047 | B1 | 1/2002 | Christopherson et al. |
| 6,388,637 | B1 | 5/2002 | Davis |
| 6,831,615 | B2 | 12/2004 | Goettl |
| 7,679,576 | B2 | 3/2010 | Riedel et al. |
| 7,907,096 | B2 | 3/2011 | Timofeev et al. |
| 7,999,752 | B2 | 8/2011 | Riedel |

(Continued)

FOREIGN PATENT DOCUMENTS

| | | | |
|---|---|---|---|
| CN | 1886864 | A | 12/2006 |
| CN | 100492763 | C | 5/2009 |

(Continued)

OTHER PUBLICATIONS

Ben A. Munk, Frequency Selective Surfaces: Theory and Design, ISBN: 978-0-471-37047-5; DOI:10.1002/0471723770; Apr. 2000, Copyright © 2000 John Wiley & Sons, Inc.

(Continued)

*Primary Examiner* — Daniel Munoz
(74) *Attorney, Agent, or Firm* — Myers Bigel, P.A.

(57) ABSTRACT

Base station antennas include a base station antenna housing with laterally extending struts laterally extending forward and rearward arms and with a reflector coupled therebetween and with longitudinally extending struts that couple to the laterally extending struts and extend in a longitudinal direction along a portion of a length of the base station antenna housing.

20 Claims, 20 Drawing Sheets

(56) References Cited

U.S. PATENT DOCUMENTS

| | | | |
|---|---|---|---|
| 10,396,460 | B2 | 8/2019 | Kosaka et al. |
| 10,978,840 | B2 | 4/2021 | Paynter et al. |
| 11,070,269 | B2 | 7/2021 | Lee et al. |
| 11,482,774 | B2 | 10/2022 | Hou et al. |
| 11,581,631 | B2 | 2/2023 | Li et al. |
| 11,652,300 | B2 | 5/2023 | Li et al. |
| 11,658,372 | B2 | 5/2023 | Kosaka |
| 11,749,881 | B2 | 9/2023 | Hou et al. |
| 2004/0169612 | A1 | 9/2004 | Song et al. |
| 2004/0201542 | A1 | 10/2004 | Gottl et al. |
| 2004/0259597 | A1 | 12/2004 | Gothard et al. |
| 2005/0134522 | A1 | 6/2005 | Waltho |
| 2005/0179610 | A1 | 8/2005 | Le et al. |
| 2005/0264463 | A1 | 12/2005 | Gottl et al. |
| 2006/0273865 | A1 | 12/2006 | Timofeev et al. |
| 2007/0229385 | A1 | 10/2007 | Deng et al. |
| 2007/0241979 | A1 | 10/2007 | Yang |
| 2008/0036674 | A1 | 2/2008 | Riedel et al. |
| 2009/0135076 | A1 | 5/2009 | Foo |
| 2009/0224994 | A1 | 9/2009 | Le et al. |
| 2012/0075155 | A1 | 3/2012 | Lindmark et al. |
| 2012/0087284 | A1 | 4/2012 | Linehan et al. |
| 2012/0280874 | A1 | 11/2012 | Kim et al. |
| 2013/0234883 | A1 | 9/2013 | Ma et al. |
| 2014/0313095 | A1 | 10/2014 | Pu et al. |
| 2015/0084823 | A1 | 3/2015 | Wang et al. |
| 2015/0097739 | A1 | 4/2015 | Samuel |
| 2015/0263424 | A1 | 9/2015 | Sanford et al. |
| 2016/0365618 | A1 | 12/2016 | Kim et al. |
| 2016/0372839 | A1 | 12/2016 | Watson et al. |
| 2017/0040665 | A1 | 2/2017 | Takashima et al. |
| 2017/0040679 | A1 | 2/2017 | Fröhler et al. |
| 2017/0099041 | A1 | 4/2017 | Wall |
| 2017/0170549 | A1 | 6/2017 | Buondelmonte |
| 2018/0040948 | A1 | 2/2018 | Göttl et al. |
| 2018/0269577 | A1 | 9/2018 | Kosaka et al. |
| 2018/0290356 | A1 | 10/2018 | Isohätälä et al. |
| 2018/0323513 | A1 | 11/2018 | Varnoosfaderani et al. |
| 2018/0331419 | A1 | 11/2018 | Varnoosfaderani et al. |
| 2019/0123426 | A1 | 4/2019 | Bryce |
| 2019/0173162 | A1 | 6/2019 | Farzaneh et al. |
| 2019/0181557 | A1 | 6/2019 | Isik et al. |
| 2019/0190146 | A1 | 6/2019 | Hand et al. |
| 2019/0267700 | A1 | 8/2019 | Hendrix et al. |
| 2019/0267701 | A1 | 8/2019 | Kim et al. |
| 2019/0268046 | A1 | 8/2019 | Kim et al. |
| 2019/0312338 | A1 | 10/2019 | Guntupalli et al. |
| 2019/0312394 | A1 | 10/2019 | Paynter et al. |
| 2019/0372204 | A1 | 12/2019 | Varnoosfaderani et al. |
| 2019/0393597 | A1 | 12/2019 | Kosaka et al. |
| 2020/0076079 | A1 | 3/2020 | Shan et al. |
| 2020/0099139 | A1 | 3/2020 | Rebegea et al. |
| 2020/0288495 | A1 | 9/2020 | Gao et al. |
| 2020/0321700 | A1 | 10/2020 | Wu et al. |
| 2021/0057801 | A1* | 2/2021 | Zhao ...................... H01Q 1/246 |
| 2021/0075092 | A1* | 3/2021 | Su .......................... H01Q 1/427 |
| 2021/0218156 | A1 | 7/2021 | Patel et al. |
| 2021/0226344 | A1 | 7/2021 | Wu et al. |
| 2021/0305717 | A1* | 9/2021 | Hou ..................... H04B 7/0413 |
| 2022/0021123 | A1 | 1/2022 | Koul et al. |
| 2022/0102842 | A1 | 3/2022 | Li et al. |
| 2022/0285858 | A1 | 9/2022 | Xiao et al. |
| 2023/0056237 | A1 | 2/2023 | Hou et al. |
| 2023/0104131 | A1 | 4/2023 | Varnoosfaderani et al. |
| 2023/0208051 | A1 | 6/2023 | Zhang et al. |
| 2023/0352811 | A1 | 11/2023 | Ponn et al. |
| 2023/0361452 | A1 | 11/2023 | Hou et al. |
| 2023/0395971 | A1 | 12/2023 | Yin et al. |
| 2024/0186711 | A1 | 6/2024 | Li et al. |
| 2024/0372248 | A1 | 11/2024 | Liu et al. |

FOREIGN PATENT DOCUMENTS

| | | | |
|---|---|---|---|
| CN | 201528038 | U | 7/2010 |
| CN | 101950846 | A | 1/2011 |
| CN | 201893434 | U | 7/2011 |
| CN | 102800956 | A | 11/2012 |
| CN | 103490175 | A | 1/2014 |
| CN | 103715521 | A | 4/2014 |
| CN | 104319486 | A | 1/2015 |
| CN | 206225553 | U | 6/2017 |
| CN | 107453044 | A | 12/2017 |
| CN | 107834198 | A | 3/2018 |
| CN | 108242596 | A | 7/2018 |
| CN | 109219905 | A | 1/2019 |
| CN | 110323564 | A | 10/2019 |
| CN | 111129769 | A | 5/2020 |
| CN | 107459805 | B | 11/2020 |
| CN | 111989824 | A | 11/2020 |
| CN | 112201939 | A | 1/2021 |
| CN | 215418610 | U | 1/2022 |
| CN | 114094347 | A | 2/2022 |
| EP | 0982800 | A2 | 3/2000 |
| EP | 1204161 | A1 | 5/2002 |
| EP | 2784876 | A1 | 10/2014 |
| EP | 2827449 | A2 | 1/2015 |
| EP | 3544204 | A2 | 9/2019 |
| EP | 3614491 | A1 | 2/2020 |
| EP | 3751665 | A1 | 12/2020 |
| EP | 3966898 | A2 | 3/2022 |
| JP | S6081902 | A | 5/1985 |
| JP | 2006108841 | A | 4/2006 |
| KR | 102129787 | B1 | 7/2020 |
| WO | 9700586 | A1 | 1/1997 |
| WO | 2009061966 | A1 | 5/2009 |
| WO | 2011160649 | A2 | 12/2011 |
| WO | 2011160849 | A1 | 12/2011 |
| WO | 2013016939 | A1 | 2/2013 |
| WO | 2019100325 | A1 | 5/2019 |
| WO | 2019154362 | A1 | 8/2019 |
| WO | 2019236203 | A2 | 12/2019 |
| WO | 2020010039 | A1 | 1/2020 |
| WO | 2020072880 | A1 | 4/2020 |
| WO | 2020159902 | A1 | 8/2020 |
| WO | 2021150384 | A1 | 7/2021 |
| WO | 2021195040 | A2 | 9/2021 |
| WO | 2021222217 | A1 | 11/2021 |
| WO | 2022055764 | A1 | 3/2022 |
| WO | 2023029431 | A1 | 3/2023 |

OTHER PUBLICATIONS

Chang et al. "Equivalent Circuit Modeling of Active Frequency Selective Surfaces" Radio and Wireless Symposium, pp. 663-666 (2008).

He et al. "Novel Dual-Band, Dual-Polarized, Miniaturized and Low-Profile Base Station Antenna" IEEE Transactions On Antennas and Propagation 63(12):5399-5408 (Dec. 2015).

Joozdani et al. "Equivalent Circuit Model of Frequency Selective Surfaces Embedded in Non-homogeneous Dielectric Slab" 24th Iranian Conference on Electrical Engineering (ICEE), pp. 380-383 (2016).

Shepard et al. "Argos: Practical Many-Antenna Base Stations" Proceedings of the 18th Annual International Conference on Mobile Computing and Networking (12 pages) (Aug. 26, 2012).

Vasquez-Peralvo et al. "Inductive Frequency Selective Surface: An Application for Dichroic Sub-Reflectors" IEEE Access, vol. 8, pp. 22721-22732 (2020).

* cited by examiner

BASE STATION ANTENNAS

RELATED APPLICATIONS

This patent application claims the benefit of and priority to U.S. Provisional Patent Application Ser. No. 63/359,304, filed Jul. 8, 2022, the contents of which are hereby incorporated by reference as if recited in full herein.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each cell is divided into "sectors." In one common configuration, a hexagonally-shaped cell is divided into three 120° sectors in the azimuth plane, and each sector is served by one or more base station antennas that have an azimuth Haft Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. In order to increase capacity without further increasing the number of base station antennas, multi-band base station antennas have been introduced which include multiple linear arrays of radiating elements. Additionally, base station antennas are now being deployed that include "beamforming" arrays of radiating elements that include multiple columns of radiating elements that are connected to respective ports of a radio so that the antenna may perform active beamforming (i.e., the shapes of the antenna beams generated by the antenna may be adaptively changed to improve the performance of the antenna). In some cases, the radios for these beamforming arrays may be integrated into the antenna. These beamforming arrays typically operate in higher frequency bands, such as various portions of the 3.1-5.8 GHz frequency band. Antennas having integrated radios that can adjust the amplitude and/or phase of the sub-components of an RF signal that are transmitted through individual radiating elements or small groups thereof are referred to as "active antennas." Active antennas can generate narrowed beamwidth, high gain, antenna beams and can steer the generated antenna beams in different directions by changing the amplitudes and/or phases of the sub-components of RF signals that are transmitted through the antenna.

Further details of example conventional antennas can be found in co-pending WO2019/236203 and WO2020/072880, the contents of which are hereby incorporated by reference as if recited in full herein.

With the development of wireless communication technology, an integrated base station antenna including a passive antenna device and active antenna device has emerged. The passive antenna device may include one or more arrays of radiating elements that are configured to generate relatively static antenna beams, such as antenna beams that are configured to cover a 120-degree sector (in the azimuth plane) of an integrated base station antenna. The arrays may include arrays that operate, for example, under second generation (2G), third generation (3G) and/or fourth generation (4G) cellular network standards. These arrays are not configured to perform active beamforming operations, although they typically have remote electronic tilt (RET) capabilities which allow the shape of the antenna beam to be changed via electromechanical means in order to change the coverage area of the antenna beam. The active antenna device may include one or more arrays of radiating elements that operate under fifth generation (5G or higher version) cellular network standards. In 5G mobile communication, the frequency range of communication includes a main frequency band (specific portion of the range 450 MHz-6 GHz) and an extended frequency band (24 GHz-73 GHz, i.e., millimeter wave frequency band, mainly 28 GHz, 39 GHz, 60 GHz and 73 GHz). The frequency range used in 5G mobile communication includes frequency bands that use higher frequencies than the previous generations of mobile communication. These arrays typically have individual amplitude and phase control over subsets of the radiating elements therein and perform active beamforming.

The active antenna device is capable of emitting high-frequency electromagnetic waves (for example, high-frequency electromagnetic waves in the 2.3-4.2 GHz frequency band or a portion thereof). At least a portion of the active antenna device is typically mounted rearwardly of the passive antenna device. Electromagnetic waves are transmitted through a front radome of the active antenna device and through a rear radome and front radome of the passive antenna device, which may hinder wave transmission of, for example, high-frequency electromagnetic waves emitted by the active antenna device.

SUMMARY

Embodiments of the present invention are directed to base station antennas with laterally extending and longitudinally extending struts that couple to at least one grid reflector.

The laterally extending struts can have a forward arm and a rearward arm. The rearward arm can be configured to couple to the right and left side wall segments of the reflector.

The base station antenna can further include a grid reflector defining a frequency selective surface (FSS) that can reside behind a plurality of columns of first radiating elements. The FSS can be configured to reflect electromagnetic waves within a first operational frequency band. The FSS can be further configured such that electromagnetic waves within a second operational frequency band can propagate through the FSS.

The second operational frequency band can be higher than the first operational frequency band. The plurality of columns of second radiating elements can be provided by an active antenna unit coupled to the base station antenna housing.

Embodiments of the present invention are directed to a base station antenna that includes: a base station antenna housing having a front radome and a rear; a passive antenna assembly in the base station antenna housing; and a plurality of laterally extending struts that are longitudinally spaced apart inside the base station antenna housing. At least some of the plurality of laterally extending struts have a forward arm that extends laterally across the base station antenna.

The base station antenna also includes at least one reflector coupled to the forward arm of the plurality of struts.

The base station antenna may also include a plurality of longitudinally extending struts coupled to left and right-side portions of the forward arm of at least some of the plurality of struts with the at least one reflector sandwiched therebetween.

At least some of the plurality of laterally extending struts can also have a rearward arm that extends laterally across the base station antenna and that can be parallel to and reside behind the forward arm, with the at least one reflector therebetween.

At least some of the plurality of longitudinally extending struts can have cable fastener features that are configured to accept cable ties. Cables can be captured by the cable ties secured to the cable fastener features whereby the cables are routed along a longitudinally extending outer perimeter of the at least one reflector.

The base station antenna can have parasitic elements that can be coupled to at least some of the plurality of laterally extending struts.

The parasitic elements can be coupled to the forward arms.

The at least one reflector can be provided as at least one grid reflector that is coupled to the forward arms.

The at least one reflector can include first and second grid reflectors, stacked in a front to back direction. The base station antenna can also have a plurality of longitudinally extending struts coupled to left and right-side portions of the forward arm of the at least some of the plurality of laterally extending struts with the first and second grid reflectors therebetween.

The at least one reflector can be provided as first and second grid reflectors, stacked in a front to back direction. At least some of the plurality of laterally extending struts can include a rearward arm that is parallel to and resides behind the forward arm. The first grid reflector can be coupled to the forward arm and the second grid reflector can be held by the rearward arm.

The at least one reflector can have right and left side wall segments that extend rearwardly and that merge into a respective inwardly extending lip. The lip can be coupled to a laterally extending brace and to a top end portion of the second grid reflector.

The at least one reflector can be provided as first and second grid reflectors, stacked in a front to back direction. The rearward arm can have right and left side cooperating laterally inwardly extending grooves that receive a portion of the second grid reflector.

The at least one reflector can be provided as first and second grid reflectors, stacked in a front to back direction. The base station antenna further can include at least one longitudinally extending strut coupled to each of left and right-side wall segments of the first grid reflector. The at least one longitudinally extending strut can define an inwardly and longitudinally extending groove that holds a segment of the second grid reflector.

The rearward arm can have forwardly projecting members that are laterally spaced apart.

The at least one reflector can have first and second grid reflectors, stacked in a front to back direction. The base station antenna can also include a plurality of standoffs extending between the first and second grid reflectors.

The forward arm can be attached to a rearward arm that is parallel to and resides behind the forward arm. The at least one reflector can include a first reflector that is sandwiched between right and left side walls of the forward and rearward arms. The first reflector can have rearwardly extending right and left side wall segments that couple to right and left side longitudinally extending struts.

The base station antenna can further include at least one right side and at least one left side longitudinally extending strut comprising a closed perimeter with an interior X shaped structure extending longitudinally between opposing end portions of the closed perimeter to thereby define a box shape structure.

The laterally extending struts and the longitudinally extending struts can be non-metallic with a low dielectric constant material.

The base station antenna can further include an active antenna unit coupled to a rear of the base station antenna housing.

The at least one reflector can include at least one grid reflector defining at least one frequency selective surface (FSS) that is configured to reflect or block electromagnetic waves from radiating elements of the passive antenna assembly and allow higher band electromagnetic waves to travel therethrough toward the front radome.

The base station antenna can further include an active antenna unit coupled to the base station antenna housing. The active antenna unit can have an array of radiating elements facing the at least one grid reflector. The array of radiating elements of the active antenna unit can be configured to propagate RF energy through the at least one grid reflector.

The at least one grid reflector can be configured to allow RF energy to pass through at one or more defined frequency range and reflect RF energy at a different frequency band.

Other embodiments of the present invention are directed to methods of assembling a base station antenna. The methods include: providing a first laterally extending radome support strut and attaching the first laterally extending radome support strut to a first grid reflector; providing a second laterally extending radome support strut and attaching the second laterally extending radome support strut to a second grid reflector; and attaching the first laterally extending radome support strut to the second laterally extending support strut thereby positioning the first and second grid reflectors in a stacked orientation between the first and second laterally extending radome support struts.

The method can also include attaching longitudinally extending struts to the second laterally extending radome support.

The method can further include attaching cables to cable fastener features provided by the longitudinally extending struts and routing cables to extend adjacent and along an outer perimeter edge portion of the first reflector.

DETAILED DESCRIPTION

Embodiments of the present invention are directed to base station antennas. In the description that follows, these base station antennas will be described using terms that assume that the base station antenna is mounted for use on a tower, pole or other mounting structure with the longitudinal axis of the base station antenna extending along a vertical axis and the front of the base station antenna mounted opposite the tower, pole or other mounting structure pointing toward the target coverage area for the base station antenna. It will be appreciated that the base station antennas may not always be mounted so that the longitudinal axes thereof extend along a vertical axis. For example, the base station antennas may be tilted slightly (e.g., less than 10°) with respect to the vertical axis so that the resultant antenna beams formed by the base station antennas each have a small mechanical downtilt.

Figure 1:
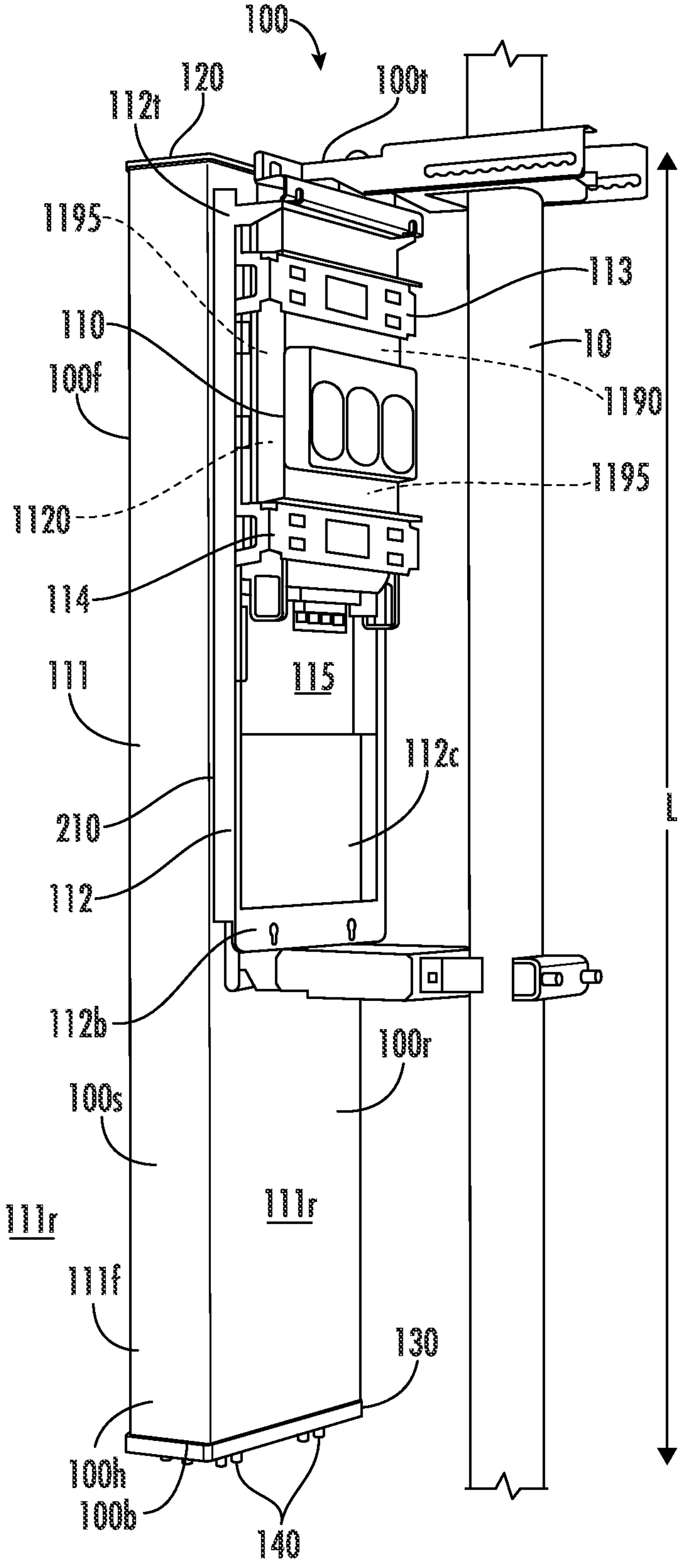
FIG. 1 is a rear, side perspective view of a base station antenna comprising an active antenna module coupled to a housing enclosing a passive antenna assembly according to embodiments of the present invention.

FIG. 1 illustrates a base station antenna 100. The base station antenna 100 has a housing **100*h* that holds a passive antenna assembly 190 (FIG. 2) and that can couple to or include at least one active antenna module 110. The housing 100*h* may be referred to as a "base station antenna housing" or a "passive antenna housing". The term "active antenna module" is used interchangeably with "active antenna unit" and "AAU" and refers to a cellular communications unit comprising radio circuitry 1120 and associated radiating elements 1195. The radio circuitry is capable of electronically adjusting the amplitude and/or phase of the subcomponents of an RF signal that are output to different radiating elements of an array of radiating elements or groups thereof. The active antenna module 110 may include both the radio circuitry and a radiating element array (e.g., a multi-input-multi-output (mMIMO) beamforming antenna array) and may include other components such as filters, a calibration network, an antenna interface signal group (AISG) controller and the like. The active antenna module 110 can be provided as a single integrated unit or provided as a plurality of stackable units, including, for example, first and second sub-units such as a radio sub-unit (box) with the radio circuitry and an antenna sub-unit (box) with a multi-column array of radiating elements. The first and second sub-units can stackably attach together, in a front to back direction of the base station antenna 100, with the radiating element array 1195 closer to the front 111*f* of the housing 100*h*/radome 111 of base station antenna 100 than the radio circuitry unit 1120. The rear surface 100*r* of the base station antenna housing 100*h* can have a pair of rails 210 that can be used to mount the active antenna module 110 thereto. The rails 210 can be longitudinally extending rails but laterally extending rails or combinations of laterally extending and longitudinally extending rails may be provided, where such rails are used. A frame 112 can be used with brackets 113, 114, 116 to mount the AAU 110 to the housing 100*h* via the rails 210. The frame 112 can have an open space 112*c* between the two outer sides and can extend a sub length of the frame 112 between top and bottom portions 112*t*, 112*b*, respectively. A metal cover 115 can be formed by or coupled to the frame 112 and can reside above the open space 112*c***. Other mounting configurations are contemplated as will be appreciated by those of skill in the art.

As will be discussed further below, the base station antenna 100 includes an antenna assembly 190 (FIG. 2) inside the housing **100*h*, which can be referred to as a "passive antenna assembly". The term "passive antenna assembly" refers to an antenna assembly having one or more arrays of radiating elements that are coupled to radios that are external to the antenna assembly, typically remote radio heads that are mounted in close proximity to the base station antenna housing 100*h*. The arrays of radiating elements included in the passive antenna assembly 190 (FIG. 2) are configured to form static antenna beams (e.g., antenna beams that are each configured to cover a sector of a base station). The passive antenna assembly 190 may comprise a backplane provided by a reflector 170, with radiating elements 222 projecting in front of the reflector and the radiating elements can include one or more linear arrays of low band radiating elements that operate in all or part of the 617-960 MHz frequency band and/or one or more linear arrays of mid-band radiating elements that operate in all or part of the 1427-2690 MHz frequency band. The passive antenna assembly 190 (FIG. 2) is mounted in the housing 100***h* of base station antenna 100 and one or more active antenna modules 110 can releasably (detachably) couple (e.g., directly or indirectly attach) to a back of the base station antenna housing 100*h*.

Referring to FIG. 1, the base station antenna housing 100*h* may be substantially rectangular with a flat rectangular cross-section. At least a front side 100*f* of the housing 100*h* may be implemented as a radome 111 providing a front radome 111*f* A "radome" refers to a dielectric cover that allows RF energy to pass through in certain frequency bands. A rear 100*r* of the housing 100*h* may also include a rear radome 111*r* that is opposite the front radome 111*f* Optionally, the housing 100*h* and/or the radome 111 can also comprise two (narrow) sidewalls 100*s* providing side radomes 111*s* facing each other and extending rearwardly between the front radome 111*f* and the rear radome 111*r*. The sidewalls 100*s*, 111*s* can have a width, measured in a front-to-back direction, that is 40%-90% less than a lateral extent of the housing 100*h*.

The top side 100*t* of the housing 100*h* may be sealed in a waterproof manner and may comprise an end cap 120 and the bottom side 100*b* of the housing 100*h* may be sealed with a separate end cap 130 with RF ports 140.

The front side 100*f*, at least part of the sidewalls 100*s* and typically at least part of the rear 100*r* of the housing 100*h* are typically implemented as radomes that are substantially transparent to RF energy within the operating frequency bands of the passive antenna assembly 190 and active antenna module 110. At least part of the radome 111 may be formed of, for example, fiberglass or plastic.

Radiation (electromagnetic waves) transmitted by the array of radiating elements 1195 in the active antenna unit 110 can transmit through a front radome of the active antenna module 110, enter the housing 100*h* from the back 100*r* and transmit out the front radome 111*f*, thus traveling through at least three radome walls spaced apart in a front-to-back direction. Active antenna modules 110 are often configured to operate using time division duplexing multiple access schemes in which the transmit and receive signals do not overlap in time, but instead the active antenna module transmits RF signals during selected time slots and receives RF signals during other time slots. The passive antenna assembly 190 can operate under frequency division duplexing (FDD) multiple access schemes.

Figure 2:
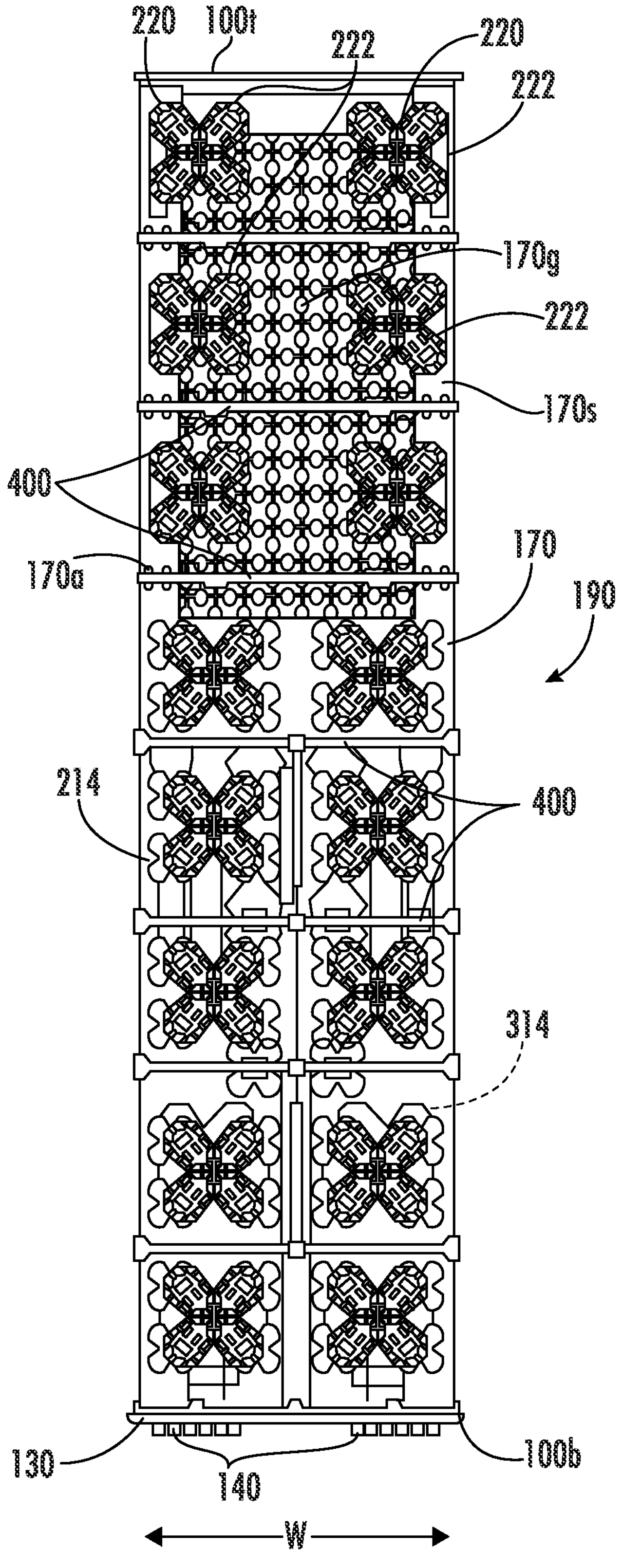
FIG. 2 is a front view of the passive antenna assembly shown in FIG. 1.

Referring to FIG. 2, a passive antenna assembly 190 is shown with a reflector 170 in the housing 100*h*. The reflector 170 can have a grid reflector segment 170*g* that extends laterally and longitudinally and can reside in front of the rear 100*r* of the housing and can also reside in front of radiating elements 1195 of the (mMIMO array) of the active antenna module 110 (FIG. 1).

Figure 3A:
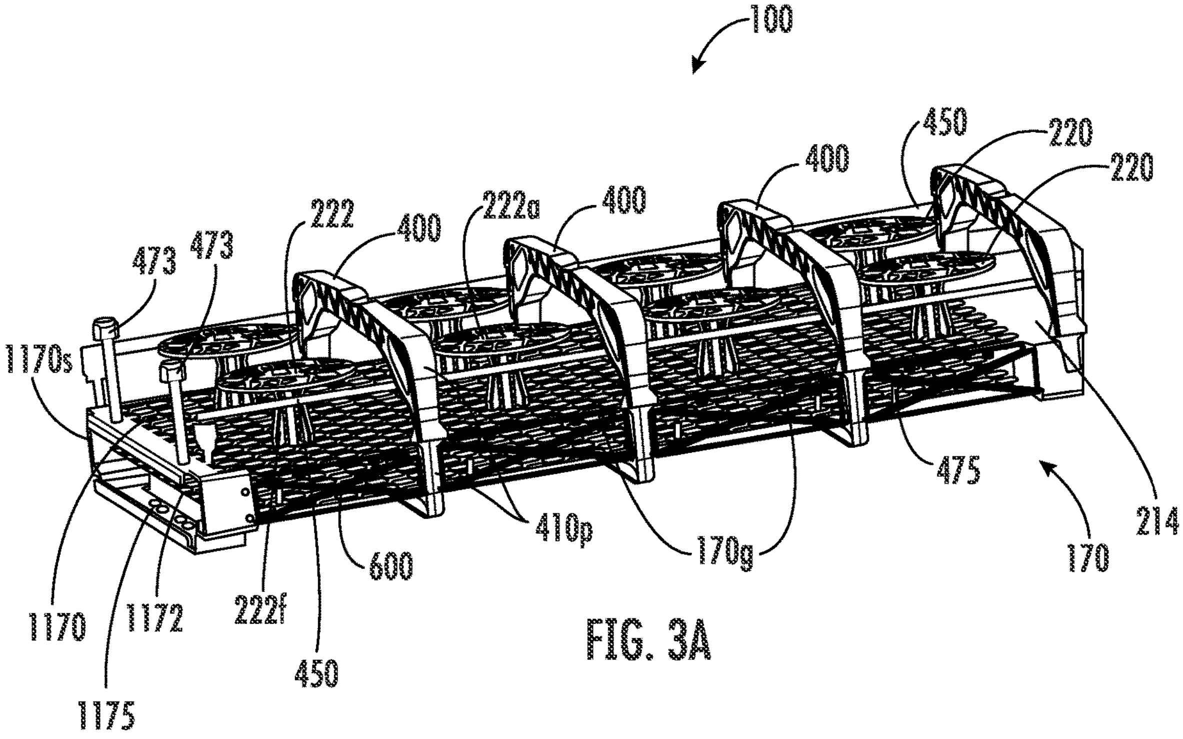
FIG. 3A is a front, side perspective view of internal components of an example base station antenna with structural supports comprising laterally extending struts according to embodiments of the present invention.

The rear 100*r* of the housing 100*h* may be provided as a closed outer surface (FIG. 1) with the internal components shown in FIG. 3A between the radome 111 and the closed rear surface 100*r*.

Figure 3B:
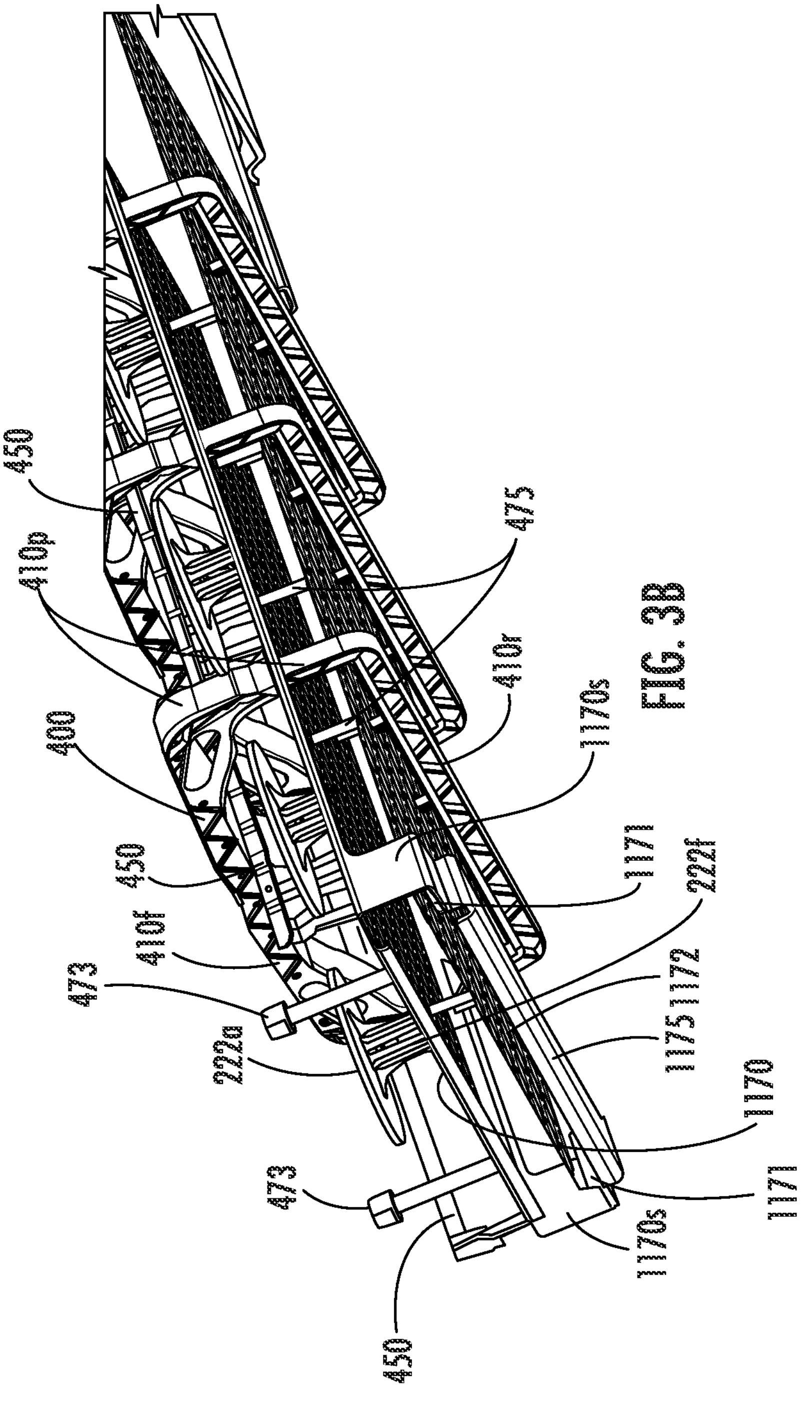
FIG. 3B is a top, rear side perspective view of the internal components shown in FIG. 3A.

Referring to FIGS. 2, 3A and 3B, the base station antenna 100 can comprise a plurality of laterally extending struts 400 that are longitudinally spaced apart and that can extend inside the base station antenna housing 100*h*.

Referring to FIGS. 3A, 3B, 6A and 6B, at least some of the struts 400 can have laterally extending pairs 410*p* of arms 410 that can be provided as forward/front and rearward/back arms, 410*f*, 410*r*, respectively, positioned in a front-to-back direction of the base station antenna 100 and that span an open space 411 therebetween.

The struts 400 can be configured so that the front arm 410*f* couples to the first grid reflector 1170 to define a closed "box" support structure for added rigidity.

Figure 5:
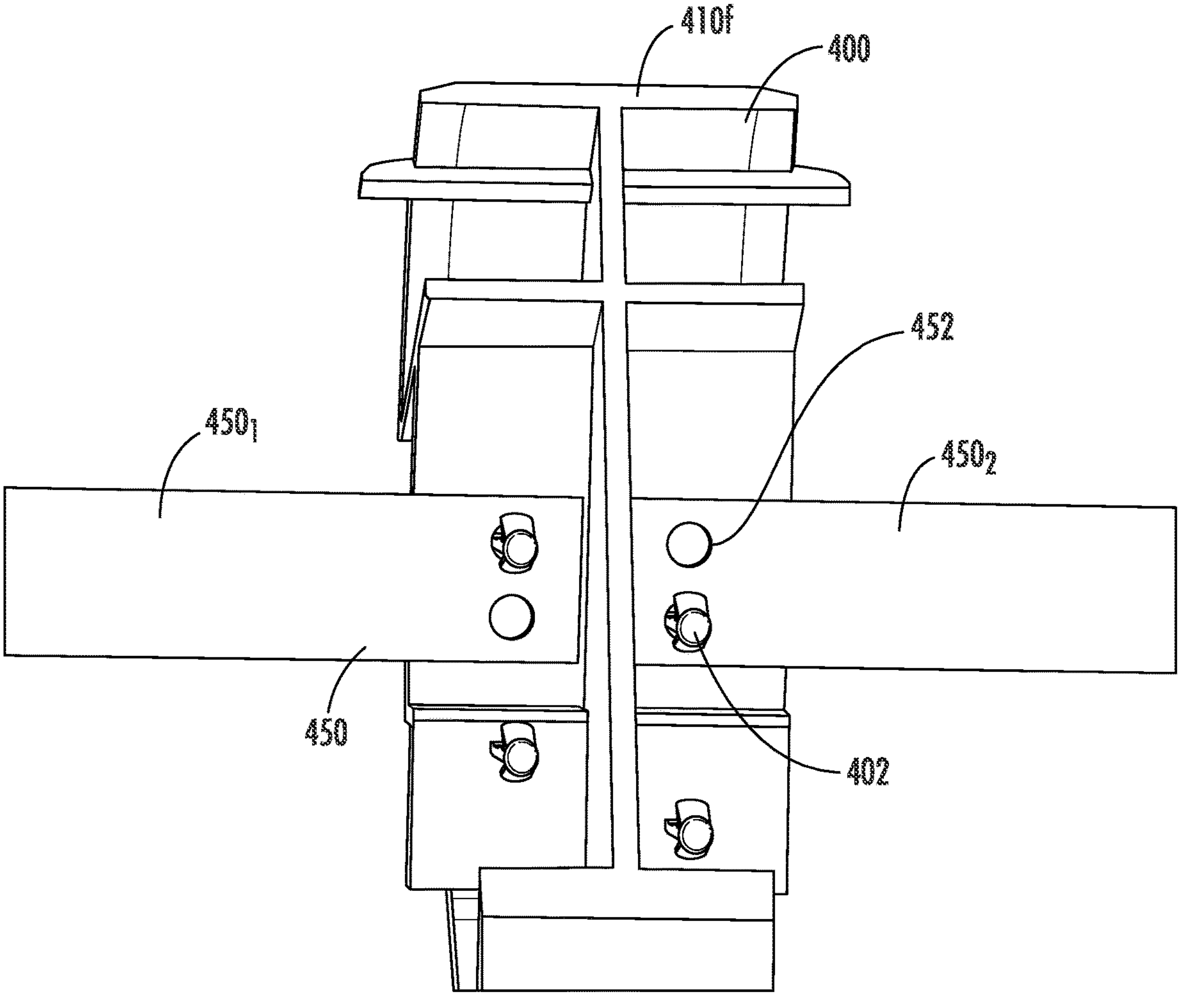
FIG. 5 is a greatly enlarged, side view of a portion of a radome support attached to parasitic elements shown in FIG. 3A.

Referring to FIGS. 3A, 3B and 5, the front arm 410*f* can comprise projecting fasteners 402 that couple to apertures 452 in parasitic elements 450. Adjacent ends of first and second parasitic elements $\mathbf{450}_1$, $\mathbf{450}_2$, respectively, can be held by the projecting fasteners 402. The parasitic elements 450 can be held at a level of dipole arms 222*a* of radiating elements 222, above respective feed stalks 222*f*.

Figure 4A:
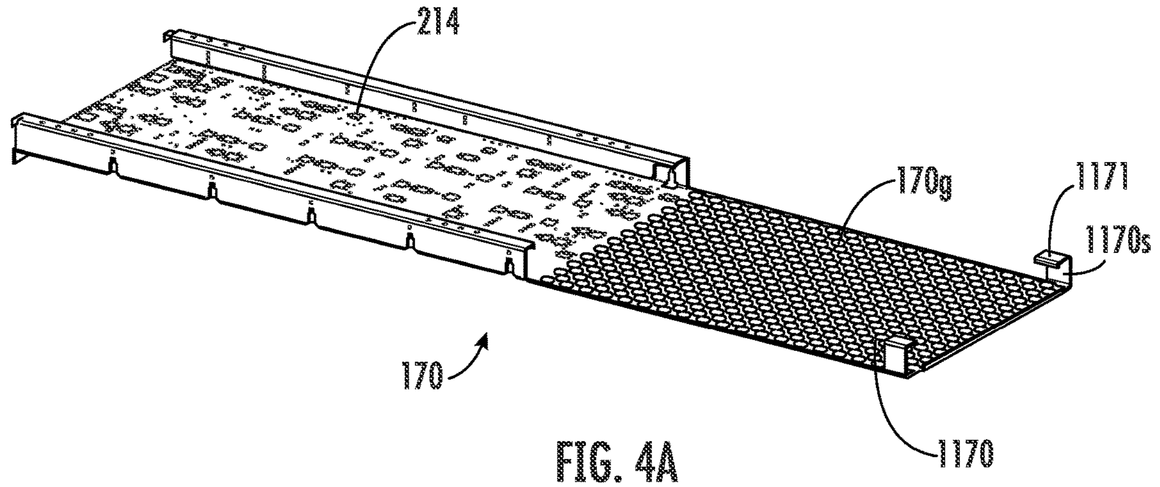
FIG. 4A is a rear, side perspective view of an example reflector structure for a base station antenna according to embodiments of the present invention.
Figure 4B:
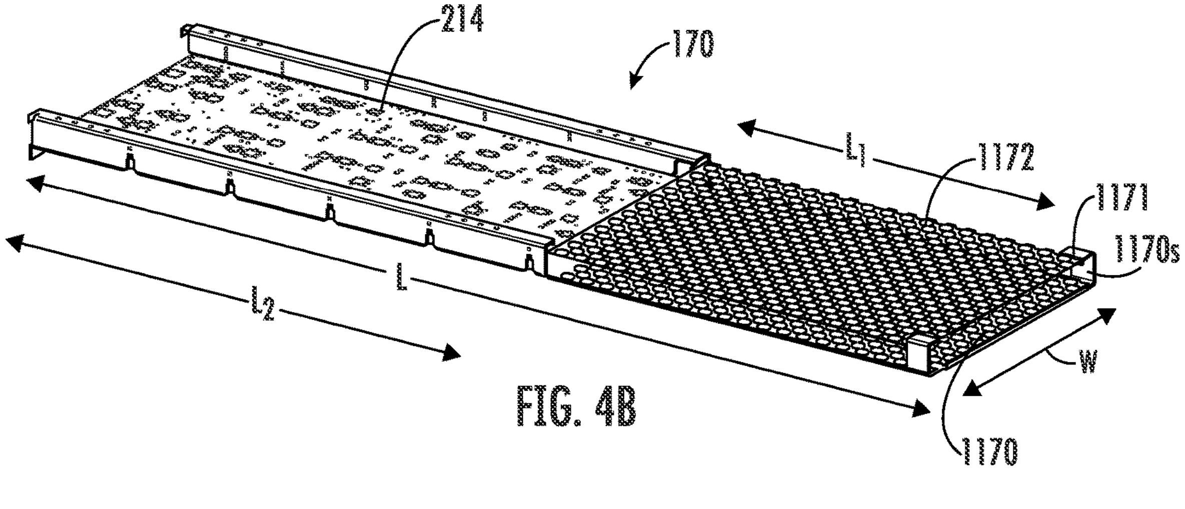
FIG. 4B is a rear, side perspective view of another example reflector structure for a base station antenna according to embodiments of the present invention.

Referring to FIGS. 2, 3A, 3B, 4A and 4B, the reflector structure 170 can have a portion provided as a grid (shown as upper) reflector 170*g* that can merge into a primary reflector portion 214 that extends longitudinally and laterally. The primary reflector 214 and the grid reflector 170*g* may be provided as a unitary sheet metal structure as shown in FIGS. 4A, 4B. However, the grid reflector 170*g* may be provided as a separate component from the primary reflector 214 and the two reflector components 170*g*, 214 can be electrically coupled to be at a common electrical ground. The primary reflector 214 may have a length $L_2$ that is greater than a length $L_1$ of the grid reflector 170*g* (with the length dimension being a longitudinal direction of the base station antenna). The primary reflector 214 can have a substantially solid reflection surface for antenna elements residing in front of the primary reflector 214 and may reside over operational components 314, such as filters, tilt adjusters and the like (FIGS. 2, 16B, 16C, 16D). The primary reflector 214 can extend forwardly of and be parallel to the grid reflector 170*g*. The primary reflector 214 can reside in a different plane than the grid reflector 170*g*, shown in FIGS. 3A, 4A and 4B with the primary reflector 214 coplanar with the grid reflector 170*g*.

The grid reflector 170*g* can be provided as first and second grid reflectors 1170, 1172 that are aligned and stacked in a front-to-back direction as shown in FIGS. 3A, 3B and 4B.

Referring to FIGS. 3A, 3B, 6A, 6B and 7, the first grid reflector 1170 can have rearwardly extending side wall segments 1170*s* that merge into a laterally inwardly extending lip 1171. The side wall segments 1170*s* of the first grid reflector 1170 can couple to corresponding side walls 414 of one or more of the laterally extending (rearward) arms 410*r*. The side wall segments 1170*s* can be provided only at the upper corners of the primary reflector 1170 as shown in FIG. 3B, for example. The side wall segments 1170*s* can be provided as a plurality of longitudinally spaced apart side wall segments or may be provided to extend continuously over the length of the primary reflector 1170. Minimizing the metal along the side walls of the first grid reflector 1170, may reduce RF interference with signal from/to radiating elements 1195 residing behind the first grid reflector 1170, such as mMIMO in an AAU 110.

Figure 6A:
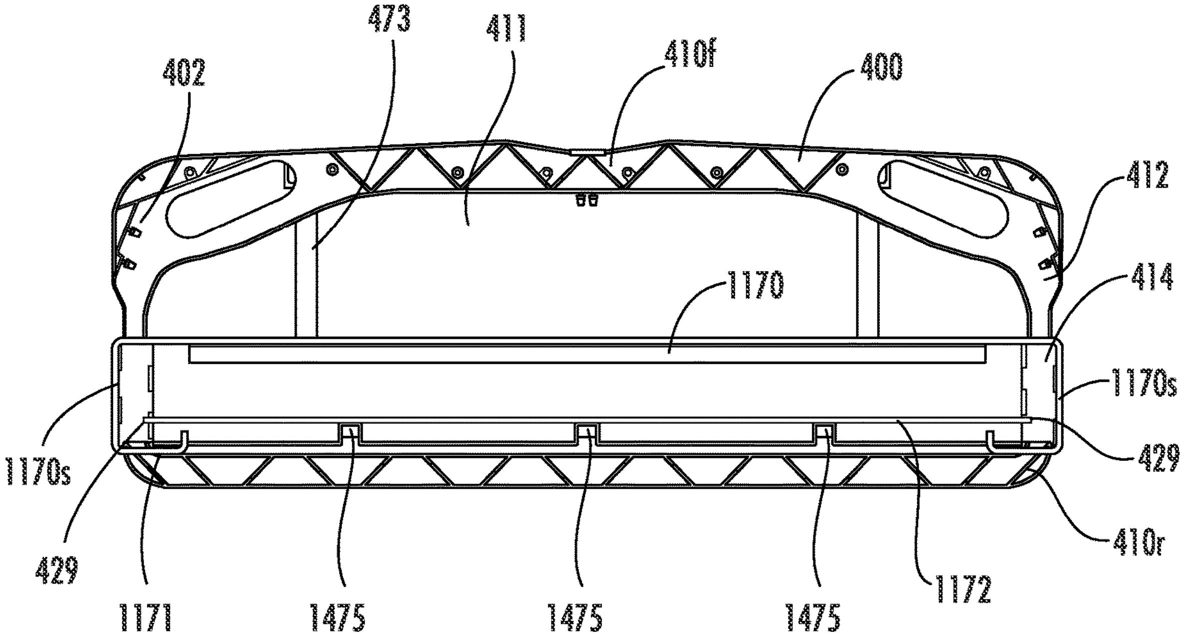
FIG. 6A is an end view of a portion of internal components shown in FIG. 3A according to embodiments of the present invention.
Figure 6B:
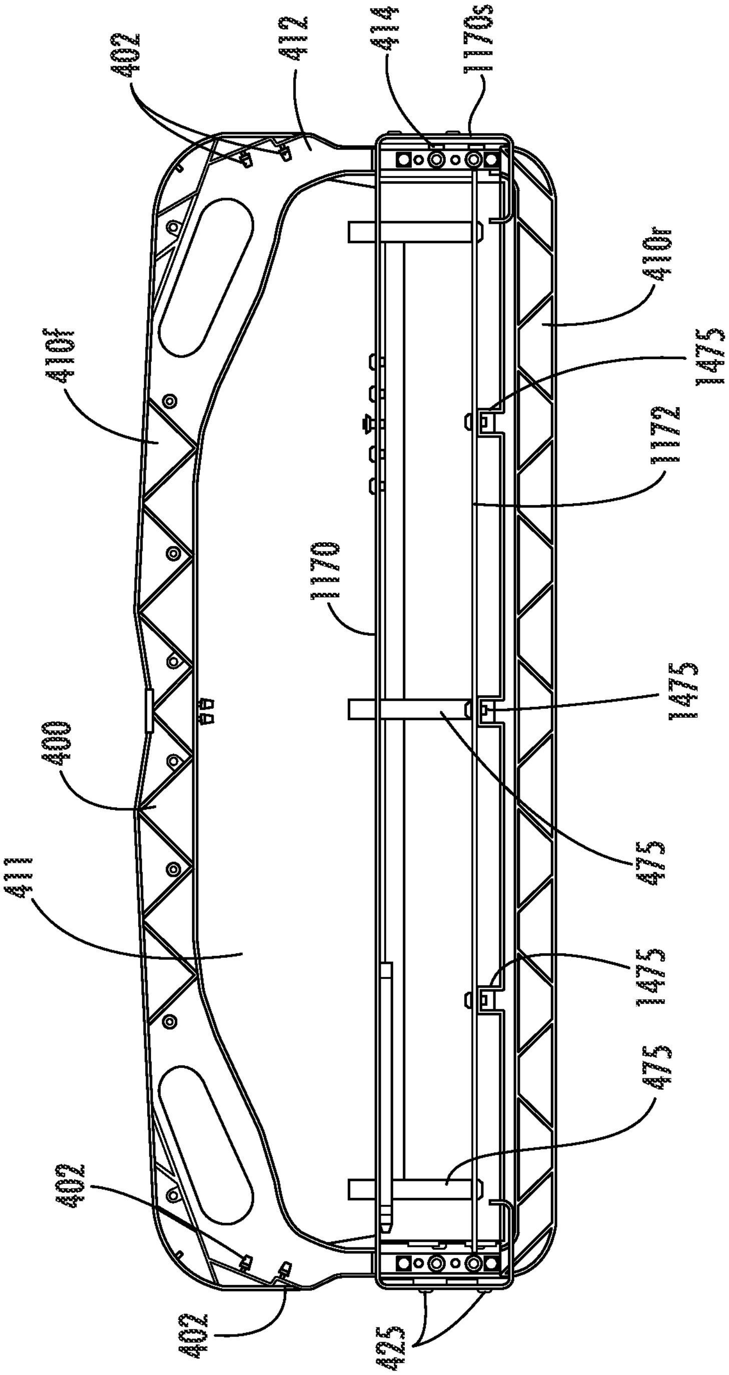
FIG. 6B is an enlarged end view of a portion of internal components shown in FIG. 3A.

The front arm 410*f* of the laterally extending strut 400 can have right and left side walls 412 that are attached to the right and left side walls 414 of the rearward arm 410*r* with the first reflector 1170 sandwiched therebetween as shown, for example, in FIG. 6A. Referring to FIGS. 3A, 6A, 6B, the side walls 412, 414 of the laterally extending struts 400 extend in a front-to-back direction of the base station antenna housing 100*h*.

Figure 8:
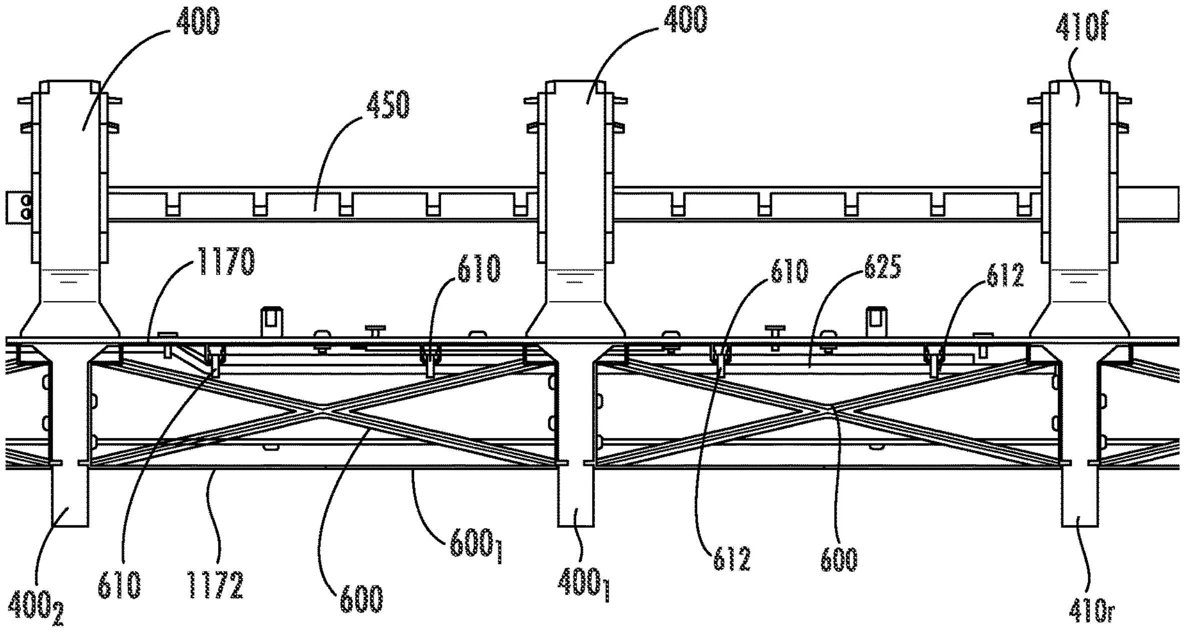
FIG. 8 is a side view of a segment of the internal components shown in FIG. 3A illustrating cable fasteners attached to the back radome support strut to guide cables according to embodiments of the present invention.
Figure 9:
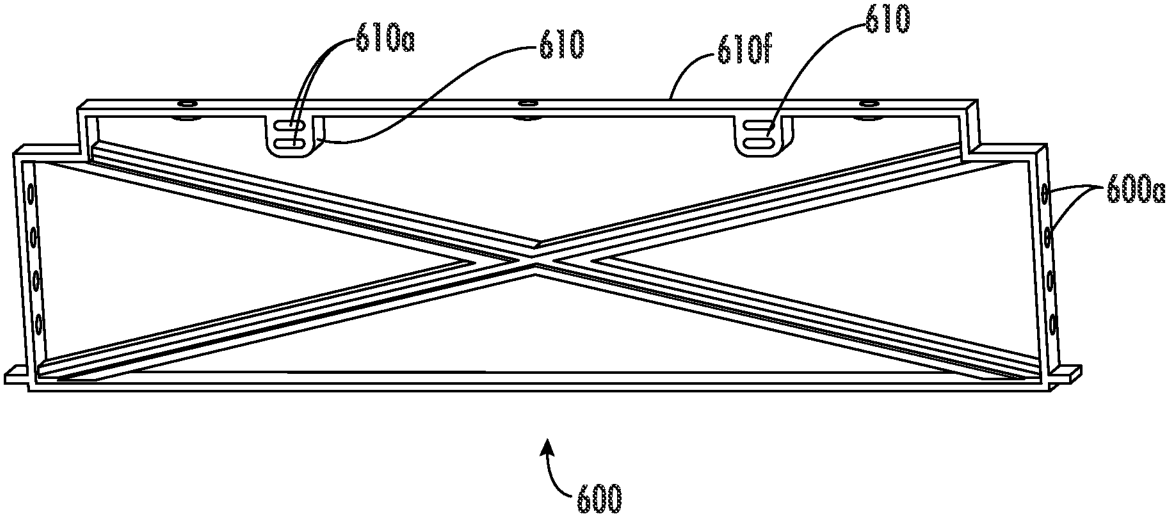
FIG. 9 is a front view of a longitudinally extending strut shown in FIGS. 3A and 8.

Referring to FIGS. 6A, 6B, and 8, the side walls 412, 414 of the front arm 410*f* and back arm 410*r* of the laterally extending struts 400 can be configured to couple together with the primary grid reflector 1170 sandwiched therebetween. At least one rivet 418 (shown as two) can extend through mounting surfaces 412*m*, 414*m* of the respective side walls 412, 414. The longitudinal struts 600 can have a stepped segment 600*s* that steps rearward from the front surface 600*f* then longitudinally over to a rearwardly extending segment 600*r* that is adjacent and parallel to a narrow side 414*n* of the sidewall 414. The narrow side 414*n* is perpendicular to a longitudinally extending side 414*l*, which has a greater extent than the narrow side. That is, the side wall 414 can have a rectangular cross-sectional shape with the long surfaces defining the longitudinally extending side 414*l* and the shorter connecting sides defining the narrow sides 414*n*. Connected Attachment members 611 can also extend through the side wall 414 to the rearward segments 600*r* of the longitudinally extending struts 600.

The first and second grid reflectors 1170, 1172 can both reside between (and spaced apart in a front to back direction) the front arm 410*f* and the rearward arm 410*r* of the laterally extending struts 400.

Figure 7:
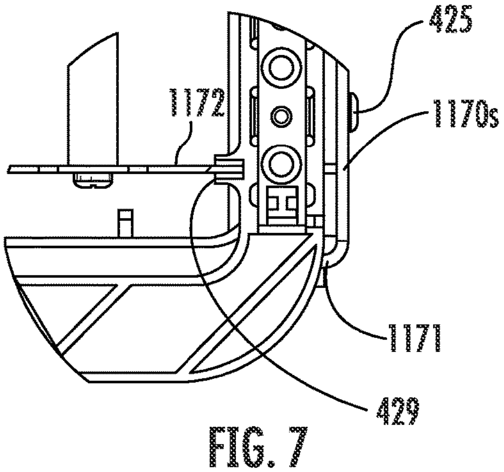
FIG. 7 is an enlarged view of a (right side) corner portion of the internal components shown in FIG. 6B.

Referring to FIGS. 6A, 6B and 7, fasteners 425 can be used to attach the rear arm 410*r* of the strut 400 to the reflector 1170.

Referring to FIG. 7, a laterally inwardly extending groove or slot 429 on each of the right and left sides of the back arm 410*r* of the laterally extending strut 400 to receive an outer edge portion of the second grid reflector 1172.

A lateral brace 1175, which can be metal, can attach to the side walls 1170*s* of the first grid reflector 1170, behind the second grid reflector 1172.

Referring to FIGS. 3A, 3B and 6A, for example, projecting attachment members 473 can extend forward of the first grid reflector 1170. These projecting members 473 can act as assembly guides during the assembly process and can protect the internal components. A radome 111 (FIG. 1) can slide into position from the top end of the antenna core. Once the radome 111 is installed, these projecting members 473 can provide additional support for wind load.

Referring to FIGS. 3B, 6B, for example, standoffs 475 can extend forward of the second grid reflector 1172 and terminate behind and adjacent to the first grid reflector 1170 or adjacent to and in front of the first grid reflector 1170.

Referring to FIGS. 6A, 6B, laterally spaced apart contact members 1475 can be provided by the back arm 410*r* of the laterally extending support strut 400. The contact features 1475 can project forward a distance sufficient to be able to abut the second grid reflector 1172. The contact features 1475 on the back arm 410*r* of the laterally extending strut/radome support 400 provides touch points that make contact with the secondary grid to increase rigidity of the structure.

As shown in FIGS. 3A, 6A, 6B, 8, 10 and 11, the base station antenna 100 can also comprise a plurality of longitudinally extending struts 600 that reside along right and left sides of the base station antenna 100. As shown, the longitudinally extending struts 600 are orthogonal to the laterally extending struts 400.

Referring to FIG. 8, the longitudinally extending struts 600 can be provided so that one longitudinally extending strut $\mathbf{600}_1$ extends between neighboring laterally extending struts $\mathbf{400}_1$, $\mathbf{400}_2$ and couples to each of the neighboring laterally extending struts $\mathbf{400}_1$, $\mathbf{400}_2$. However, in other embodiments the longitudinally extending strut 600 can be configured to extend across two or more of the laterally extending struts 400 (not shown).

Figure 11:
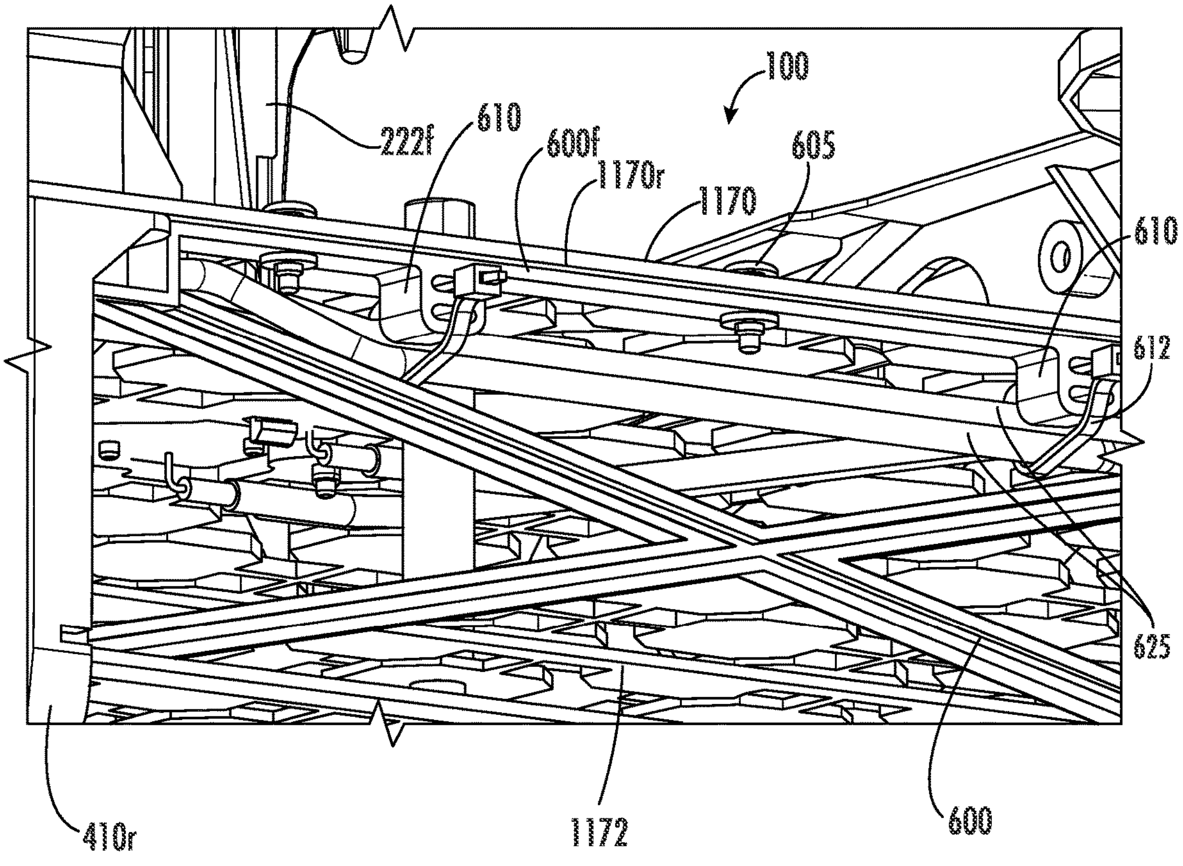
FIGS. 11, 12A, 12B and 13 are enlarged, rear side perspective views of portions of the base station antenna shown in FIG. 10 illustrating the cable fasteners and cable orientations and positioning according to embodiments of the present invention.
Figure 12A:
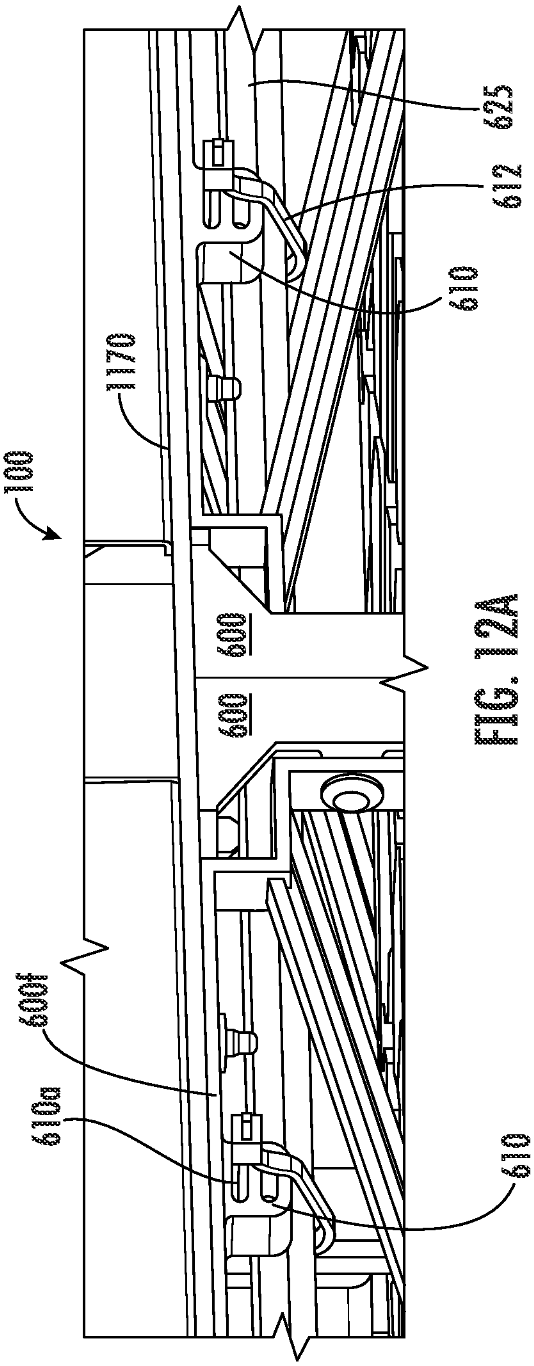
Figure 12B:
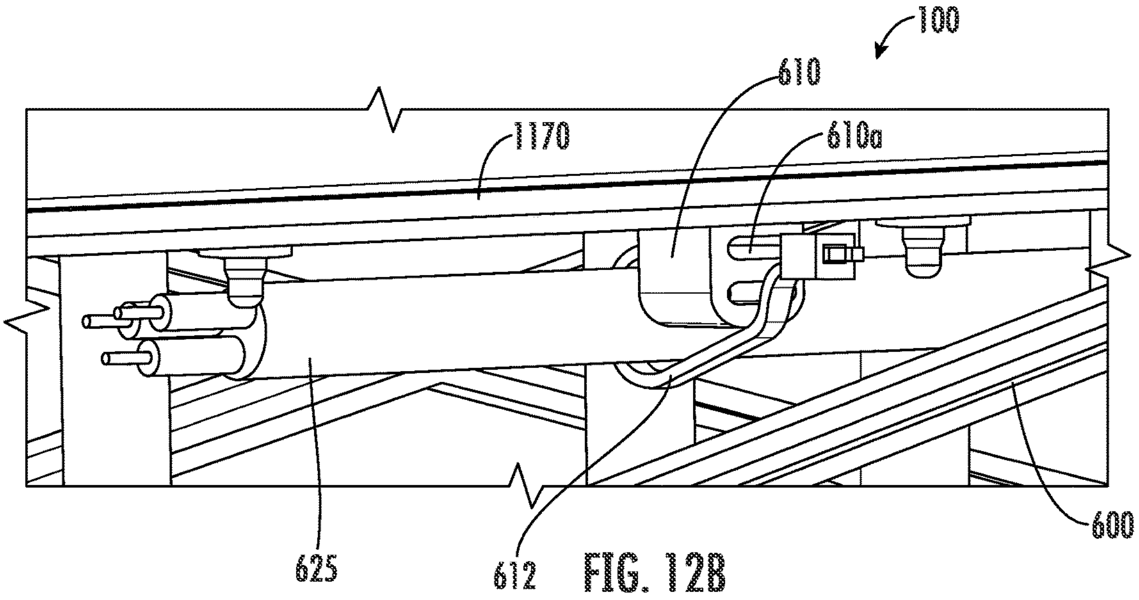
Figure 13:
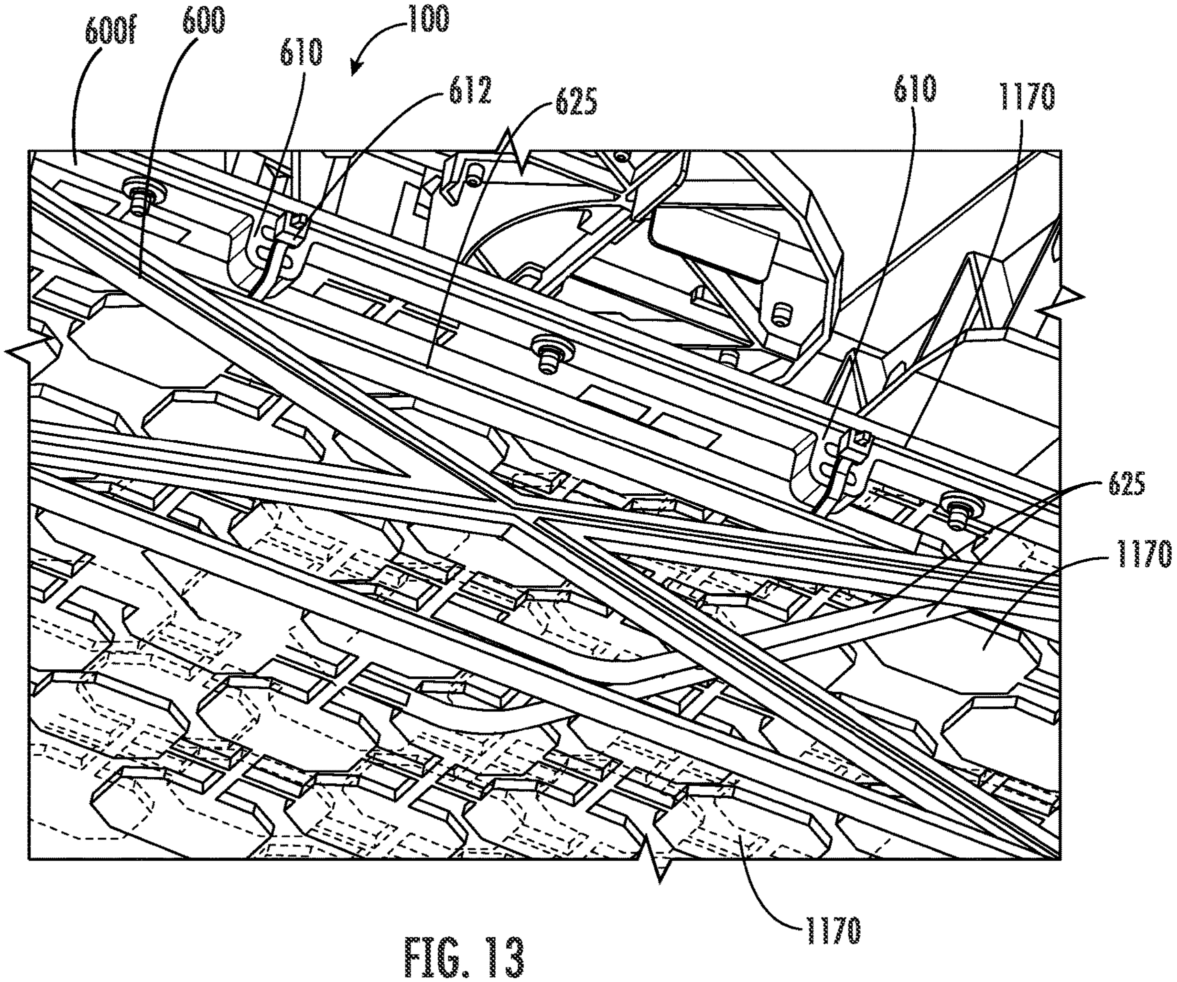

Referring to FIG. 11, a front surface 600*f* of the longitudinally extending struts 600 can abut and/or attach to a rear surface 1170*r* of the first grid reflector 1170 via fasteners 605.

The laterally extending struts 400 and the longitudinally extending struts 600 can be a molded, dielectric material. The laterally extending struts 400 and/or the longitudinally extending struts 600 can have a lightweight polymer or copolymer body. The laterally extending struts 400 can each be provided as a monolithic unitary body or may be provided as separate attachable components as shown.

The laterally extending struts 400 and/or the longitudinally extending struts 600 can be formed of a low dielectric constant "Dk" material. Example materials and corresponding dielectric constants are provided below in TABLE 1, by way of example only.

TABLE 1

DIELECTRIC CONSTANT OF SOME PLASTICS

| PLASTICS | DIELECTRIC CONSTANT |
|---|---|
| Melamines | 5.2-7.9 |
| Phenolics | 4.0-7.0 |
| Nylon 30% Gf | 3.5-5.4 |
| Epoxies | 4.3-5.1 |
| High impact polystyrene | 2.0-4.0 |
| Nylon | 3.5-3.8 |
| Acetals | 3.7 |
| Polycarbonate 30% GF | 3.48 |
| Polysulfone 30% GF | 3.4 |
| Thermoplastic Polyester | 3.2 |
| ABS | 3.2 |
| ASA, ASA + FG | 3.2-3.8 |

In some embodiments, the low dielectric constant ("Dk") material can be used where Dk is in a range of 3.2-3.8, such as Acetal, or POM, or ASA can be used. However, as shown in Table 1 above, the Dk may be in a range of 3-8.

The struts 400 can be configured to allow the base station antenna housing 100*h* to withstand wind load and reduce deformation in the frontal wind direction. In contrast to conventional configurations, which provide radome supports only on the front side of the reflector to counter wind load, embodiments of the present invention provide a back radome support 410*b* and create a box construction with the front radome support in X-Y plane to strengthen the structure.

The longitudinally extending side struts 600 and the adjacent back radome supports 410*r* can also form a box construction in antenna lengthwise direction to provide rigidity in the longitudinal/lengthwise direction. The longitudinally extending struts 600 can have an X brace configuration about open spaces thereof and spanning along a length of the strut between front and back portions thereof for low weight, but structural rigidity.

Cable routing can have significant impact on RF performance, particularly where a grid reflector(s) is used. Referring to FIGS. 8, 9, 10, 11, 12A, 12B and 13, the longitudinally extending struts 600 can incorporate cable fastening features 610 that guide and secure cables 625. Cable ties 612 can extend through apertures 610*a* of the cable fastening features 610 and couple to cables 625 to position the cables 625 along a longitudinally extending outer perimeter edge portion of the reflector 1170, either on the inside or outside edge thereof. In some embodiments, the cable fastening features 610 are configured to cooperate with the cable ties 612 to position respective sets of cables 625 within about 0.25 inches or less of the outer edge of the reflector 1170 which can minimize, reduce or eliminate RF interference.

The cable fastening features 610 can be provided as a plurality of longitudinally spaced apart cable fastening features 610, shown as two, on a front wall portion 600*f* of each of the longitudinally extending struts 600. The (coaxial) cables 625 connect feed circuits of radiating elements 222 to RF ports as is well known to those of skill in the art.

Figure 10:
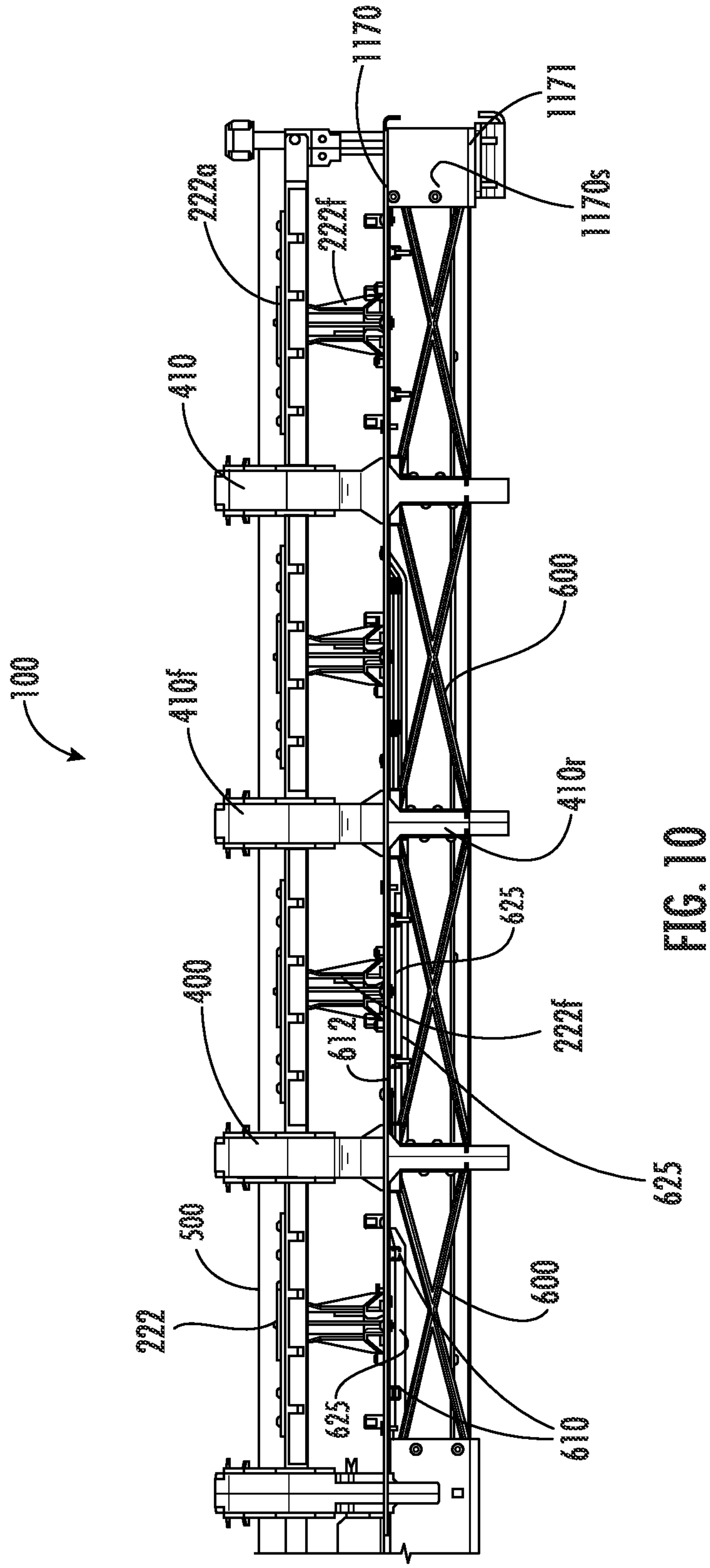
FIG. 10 is a side view of the cables and cable fasteners shown in FIG. 8 and also illustrating radiating elements according to embodiments of the present invention.

Referring to FIG. 10, the laterally extending struts 400 can support at least one matching layer 500 (FIG. 10). Where used, the at least one matching layer 500 can be configured to adjust the radiation pattern generated by radiating elements positioned behind the at least one matching layer. The matching layer(s) can be configured to reduce reflections that may otherwise occur because certain radiating elements are relatively far way (behind) the front radome placing the front radome in the far-field. Dielectric materials that form the front radome and/or rear radome of the passive antenna device 190/100*h* typically have frequency selectivity to electromagnetic waves. The higher the frequency of the electromagnetic waves, the greater the effect of the dielectric materials thereon, such as poorer transmittance and higher reflectivity. Poorer transmittance may cause the signal strength of the electromagnetic waves to be reduced, thereby causing the gain of the base station antenna to be reduced. The higher the reflectivity, the more the electromagnetic waves are reflected by the radome 111*f*, 111*r* and these reflected waves superimpose with the electromagnetic waves radiated by the radiating elements, which cause jitters and ripples in the radiation pattern. These are undesirable effects.

In order to compensate the adverse effects of the radome of the passive antenna device 190, such as the front radome 111*f*, on the electromagnetic waves from the active antenna unit 110, a matching (dielectric) layer 500 and/or 600 may be provided in the passive antenna device 190, where the matching layer 500 and/or 600 may be arranged between the radiating element array 220 of the passive antenna device 190 and the front radome 111*f*. The matching layer 500 and/or 600 may have a certain thickness and dielectric constant, and the dielectric constant of the matching layer 500 and/or 600 is larger than the dielectric constant of air. Design personnel may adjust the reflection of the electromagnetic waves from the active antenna unit 110 by designing the thickness and dielectric constant of the matching layer 500 and/or 600 such that these reflected waves superimpose out of phase and even anti-phase to reduce the reflectivity of the entire radome, thereby allowing the reflectivity and transmittance of the entire radome to meet design goals.

The distance between the matching layer 500 and the front radome 111*f* of the (passive antenna) housing 100*h* may be any suitable distance. The distance between the rear radome 111*r*/100*r* of the housing 100*h* and the matching layer 500 can be up to a first distance D1, and the distance between the active antenna unit 110, such as the front radome 119 thereof, and the rear radome 111*r*/100*r* of the (passive antenna) housing 100*h* is up to a second distance D2. The first distance may be selected as 0.25+n/2 times that of the equivalent wavelength, where n is a positive integer (such as 1, 2, 3, 4, . . . ) and the second distance may be selected as 0.25+N/2 times of the equivalent wavelength, where N is a natural number (such as 0, 1, 2, . . . ). The equivalent wavelength is associated with a wavelength corresponding to the center frequency of the operating frequency band of the radiating elements in the active antenna unit 110, such as the theoretical wavelength in an air medium or in vacuum. In other words, the selection of the first distance D1 and the second distance D2 in the passive antenna housing 100*h* is related to the operating frequency band of the radiating elements 1195 in the active antenna unit 110. By selecting an appropriate distance, the reflection of the electromagnetic waves from the active antenna unit 110 by the passive antenna device 100*h* may be effectively reduced.

The distance between the matching layer 500 and the front radome 111*f* of the (passive antenna) housing 100*h* may be up to a third distance D3, which may be selected as 0.25+M/2 times the equivalent wavelength, where M is a whole number (such as 0, 1, 2, . . . ).

In some embodiments, the equivalent wavelength may be within the range of 0.8 to 1.2 times the wavelength corresponding to the center frequency. In some embodiments, the equivalent wavelength may be within the range of 0.9 to 1.1 times the wavelength corresponding to the center frequency. In some embodiments, the equivalent wavelength may be equivalent to the wavelength corresponding to the center frequency.

As an example, where the operating frequency band of the radiating elements in the active antenna unit 110 is 2.2-4.2 GHz, the center frequency may be selected as 3.2 GHz. The wavelength corresponding to the center frequency may be approximately 90 mm. When the equivalent wavelength is equivalent to the wavelength corresponding to the center frequency, the first distance D1 may be 67.5 mm (n=1), 112.5 mm (n=2), 157.5 mm (n=3) . . . 67.5+(n−1)*45 mm, and the specific size may be determined based on actual needs. At the same time, the second distance D2 may be selected as 22.5+N*45 mm, and the third distance D3 may be selected as 22.5+M*45 mm. Typically, in order to reduce the size of the base station antenna, N and M may be selected as 0.

Again, it should be understood that the aforementioned matching layer 500 and/or 600 is not required.

It should be understood that when the distance between two dielectric layers is selected as 0.25+n/2 times the equivalent wavelength, the aforementioned effects may similarly be applicable. For this, design personnel may consider the requirements on the size of the base station antenna while adjusting the distance between two adjacent dielectric layers such that these reflected waves superimpose out of phase and even anti-phase to reduce the reflectivity in the entire transmission process, thereby allowing the reflectivity and transmittance of high-frequency electromagnetic waves to meet the design goals.

Figure 14A:
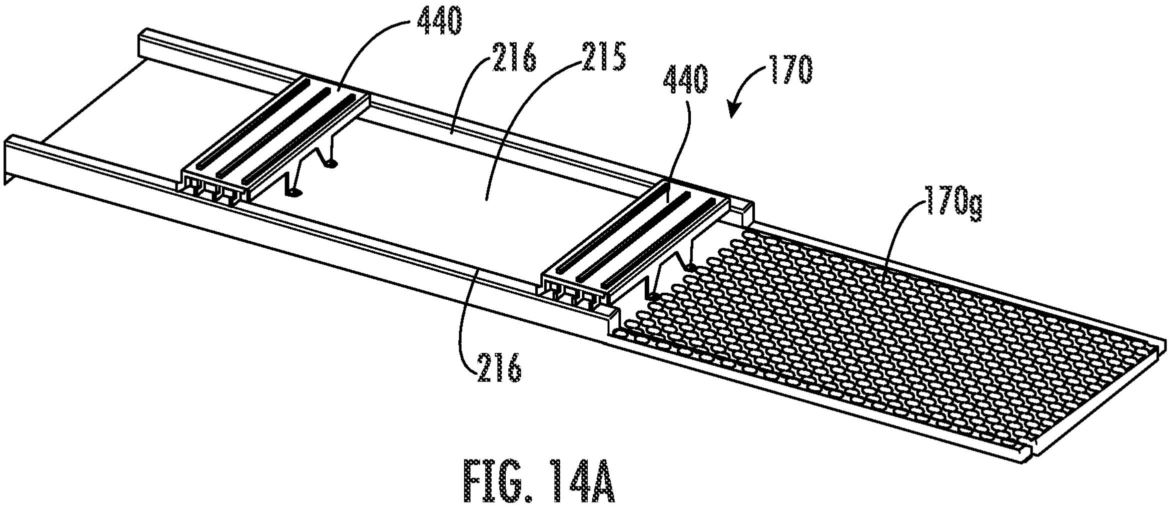
FIG. 14A is a rear, side perspective view of a reflector structure and another example strut and structural reinforcement/support configuration according to embodiments of the present invention.

Referring to FIG. 14A, in some embodiments, the reflector 170 can have a plurality of laterally extending support members 440 that extend across the primary reflector 214 and couple to longitudinally extending rail portions 216 for added rigidity. The support members 440 can be non-metallic such as formed of plastic (polymer/copolymer) or fiberglass or fiberglass embedded polymers/co-polymers or other suitable material such as carbon reinforced polymers/copolymers or other plastics. See Table 1 herein for example materials.

Figure 14B:
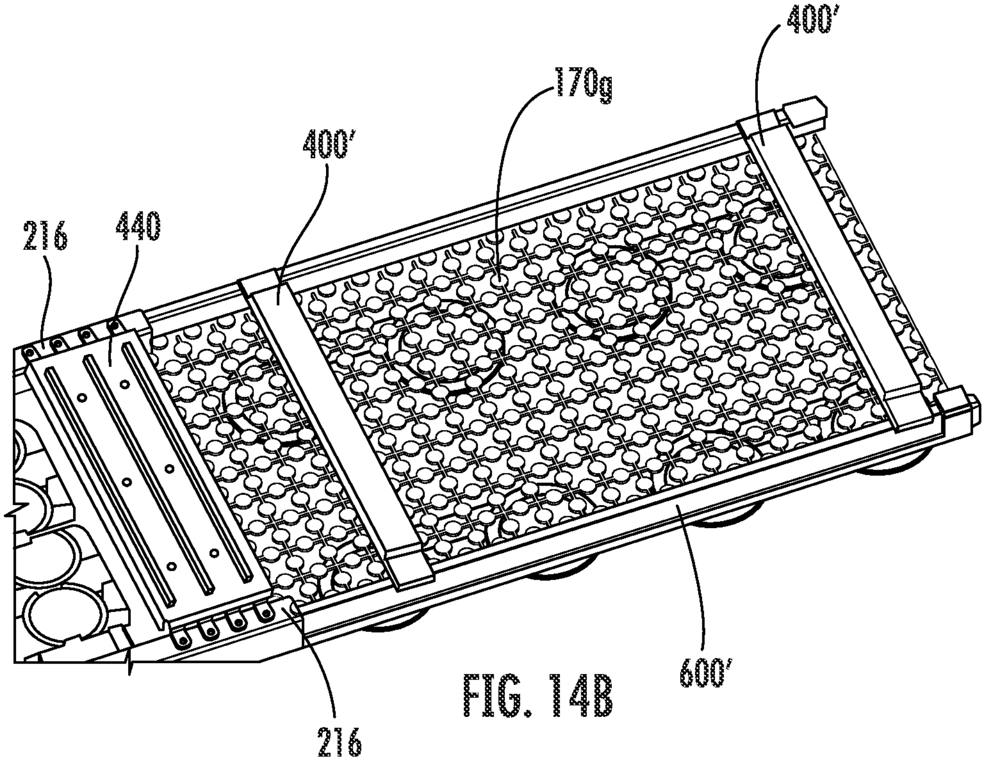
FIG. 14B is a rear, side perspective view of the reflector structure and example strut and structural reinforcement/support configuration shown in FIG. 14A with further structural support members according to embodiments of the present invention.

Referring to FIG. 14B, the grid reflector 170*g* can have cross-struts 400' that couple to longitudinally extending struts 600' coupled to longitudinally extending outer perimeter segments of the reflector 170.

Figure 15A:
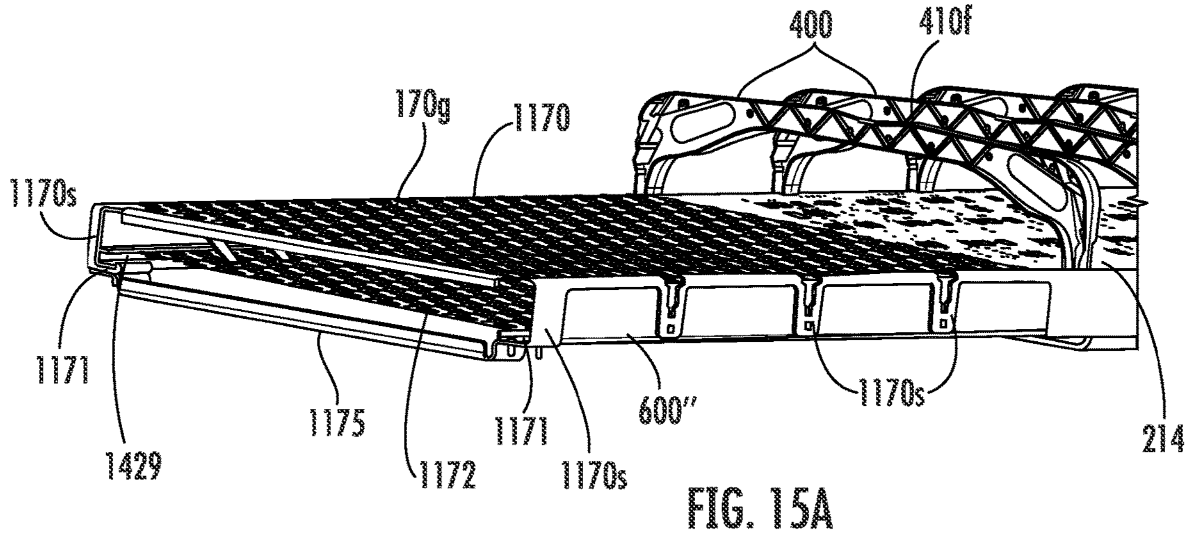
FIG. 15A is a top, side perspective view of another structural support configuration of a base station antenna with a grid reflector(s) according to embodiments of the present invention.
Figure 15B:
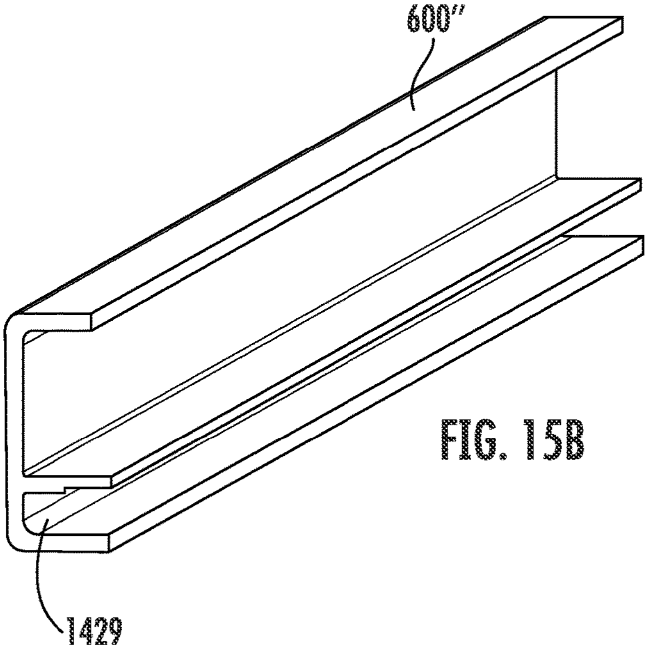
FIG. 15B is a side perspective view of the longitudinally extending strut shown in FIG. 15A.
Figure 16A:
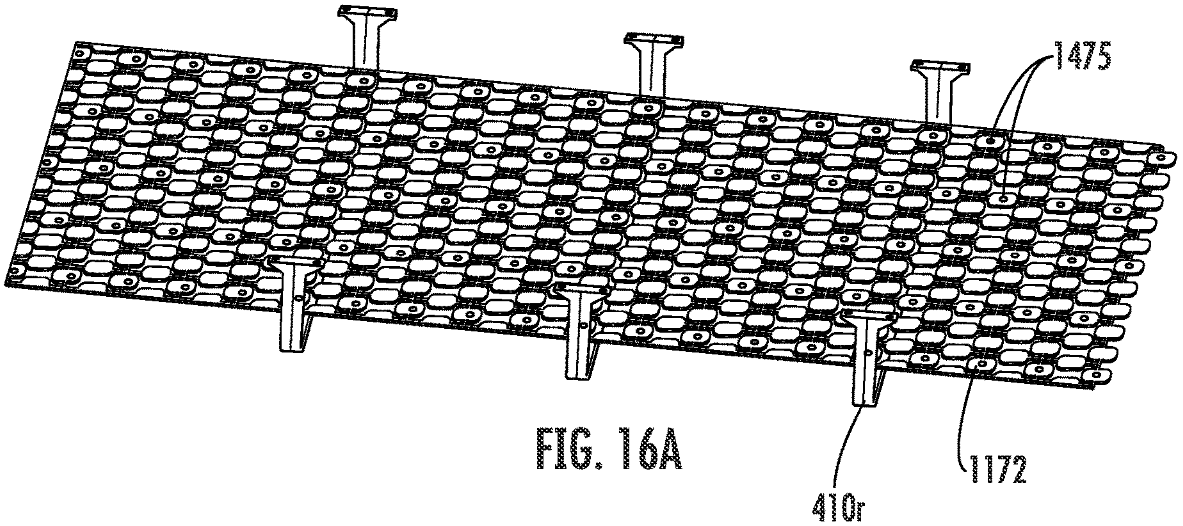
FIGS. 16A-16D are side perspective views of example assembly steps that can be used to assemble the support members and grid reflectors of the base station antenna according to embodiments of the present invention.
Figure 16B:
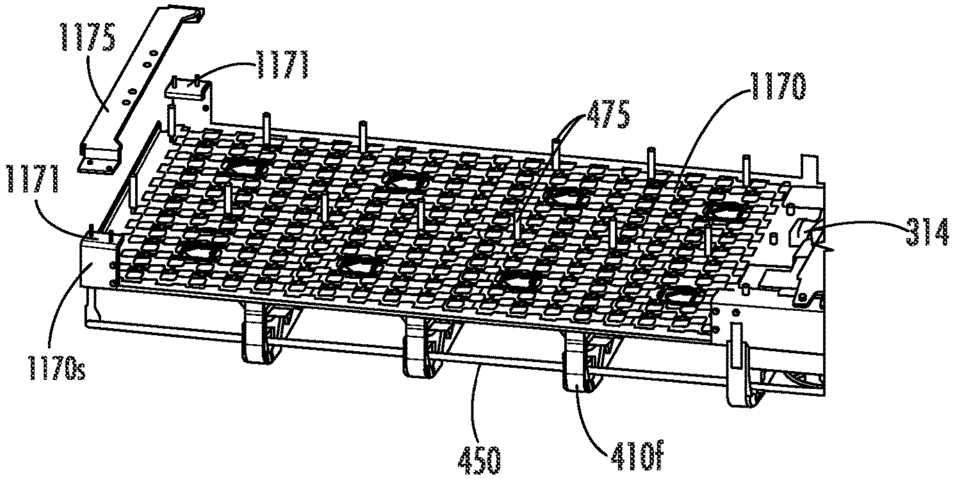
Figure 16C:
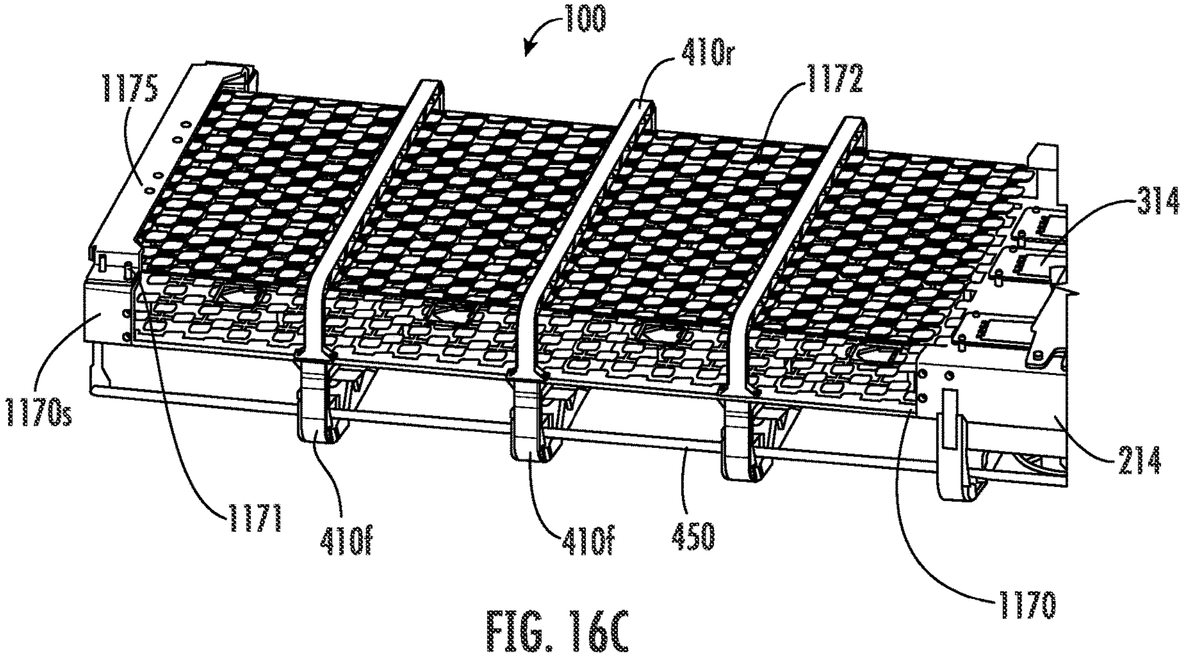
Figure 16D:
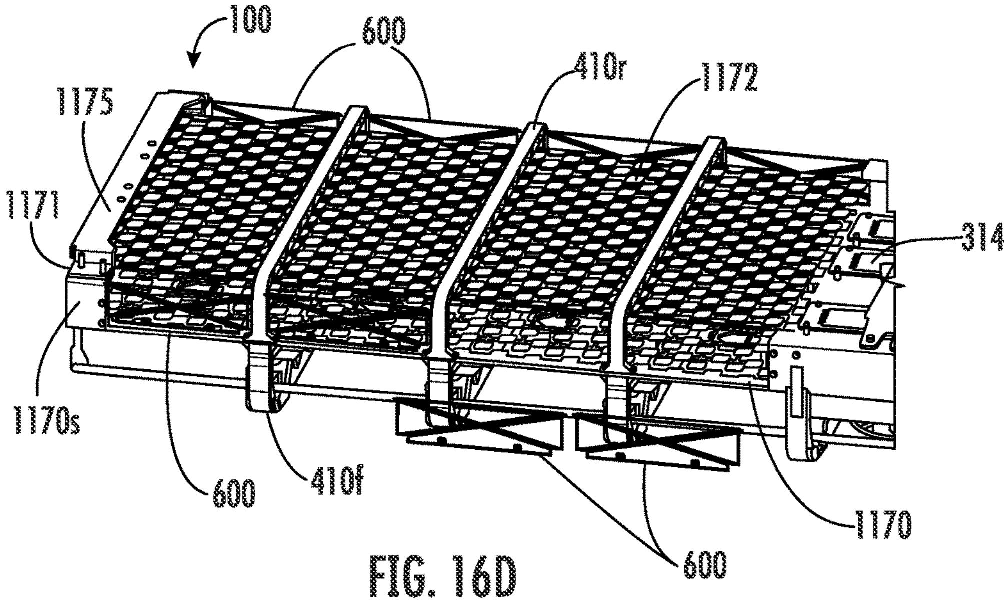

Referring to FIGS. 15A and 15B, the laterally extending struts 400 can be configured to provide only front arms 410*f* that couple to the grid reflector 170*g*, 1170 and/or primary reflector 214. The base station antenna 100 can have longitudinally extending struts 600" that directly couple to side wall segments 1170*s* of the first grid reflector 1170. One or more each of the right side and left side longitudinally extending struts 600" can provide a laterally inwardly extending groove 1429 that slidably receives and holds the second grid reflector 1172.

The struts 400', 600', 600" can be non-metallic such as formed of plastic (polymer/copolymer) or fiberglass or other suitable material. The struts 400', 600' can be formed of a low Dk material as discussed above with respect to other embodiments.

It is noted that the strut configurations described herein are not limited to uses in base station antennas with one or more grid reflectors 170*g*. The struts 400, 400' and/or 600, 600', 600" and support members 440 may be useful for any base station antennas or AAUs needing structural reinforcement.

FIGS. 16A-16D illustrate an example sequence of assembly actions that can be used to assemble two-piece laterally extending struts 400 and one or more reflector coupled thereto. It is believed that providing two-part struts 400 can facilitate the assembly process relative to integrated single piece struts 400. As shown, there are front and back arms 410*f*, 410*r* of the struts 400 and the second grid reflector 1172 can be mounted to the back arm 410*r*. The first grid reflector 1170 can be mounted to the front arm 410*f*. The standoffs 475 can be provided on the rear surface of the first grid reflector 1170. The front and back arms 410*f*, 410*r*, respectively, of the struts 400, can be attached together with the stacked grid reflectors 1170, 1172 therebetween. The longitudinally extending struts 600 can be attached to the back arms 410*r* and the front arms 410*f*.

Figure 17A:
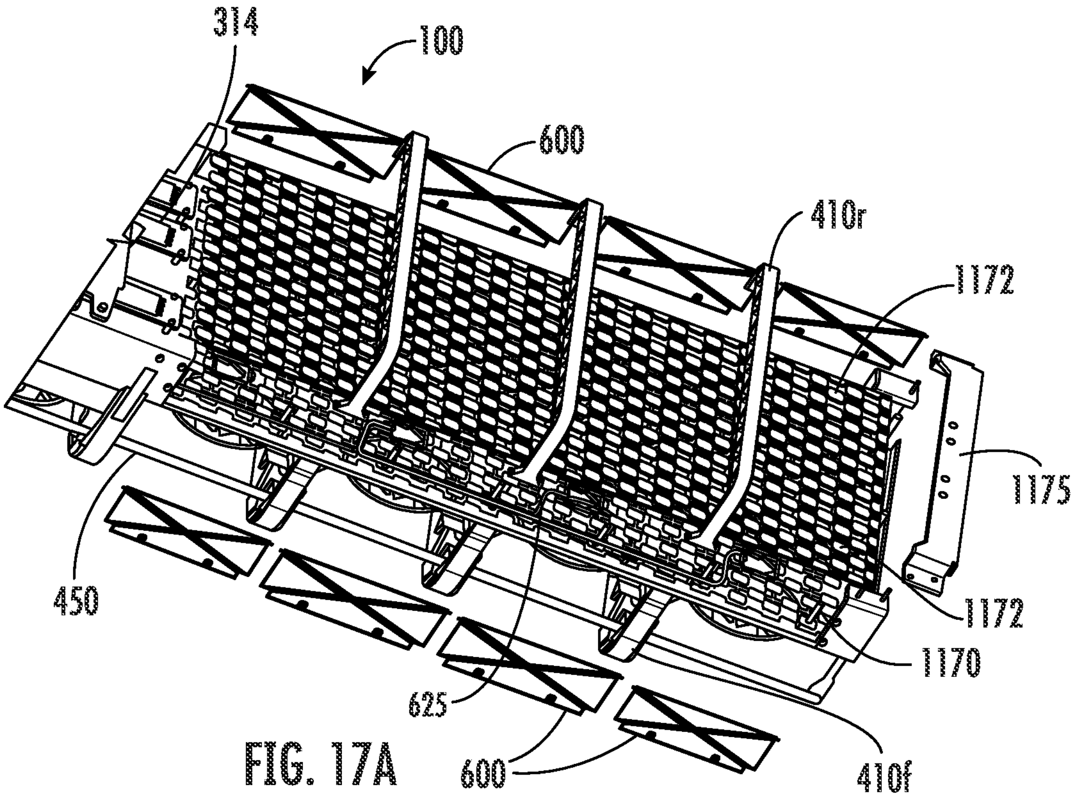
FIGS. 17A and 18A are partially exploded, front perspective views showing the front radome support and the longitudinally extending struts adjacent the primary reflector structure and unassembled.
Figure 17B:
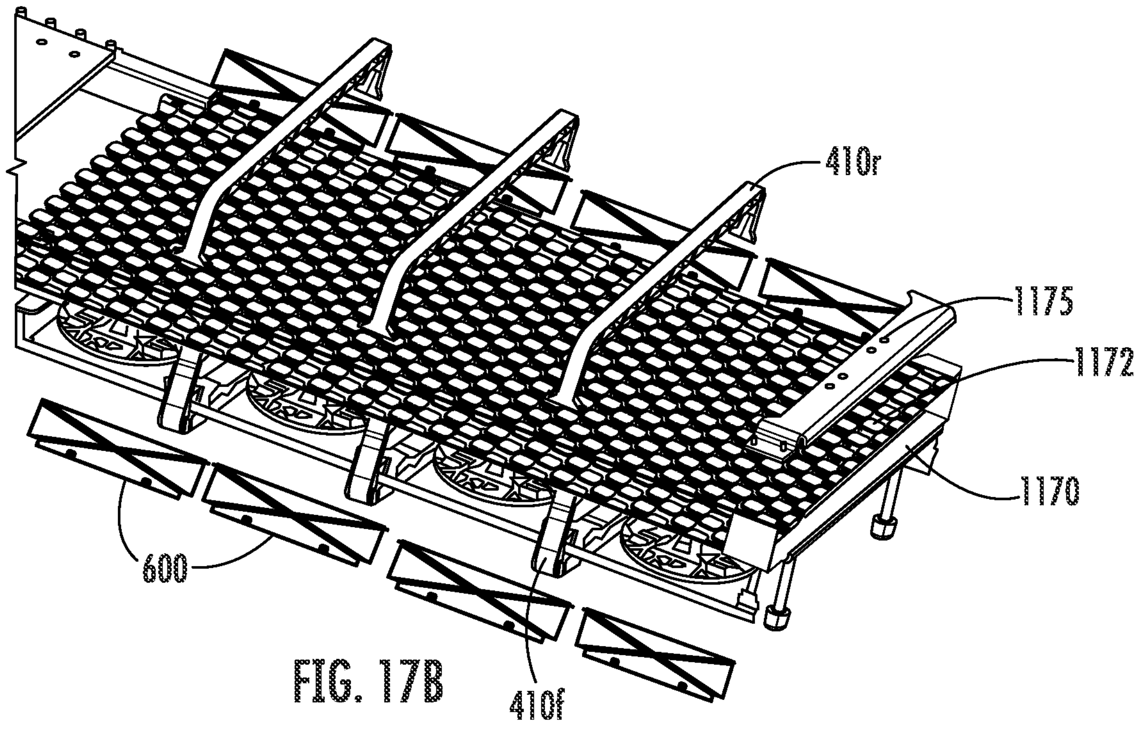
FIGS. 17B and 18B are front, perspective views of the components of FIGS. 17A and 18A, respectively, with the front radome support and the longitudinally extending struts in an assembled state.
Figure 18A:
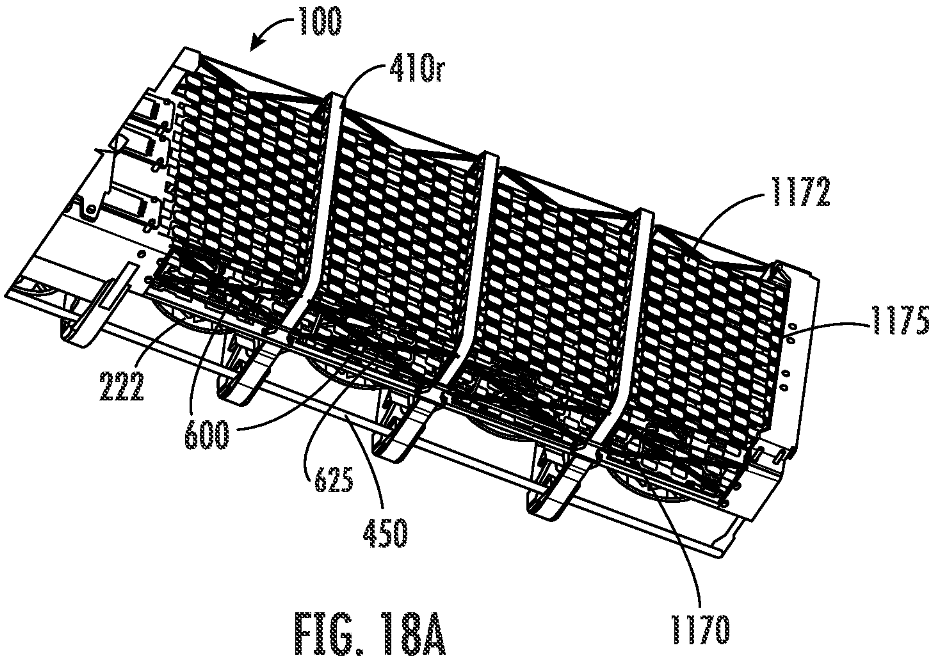
Figure 18B:
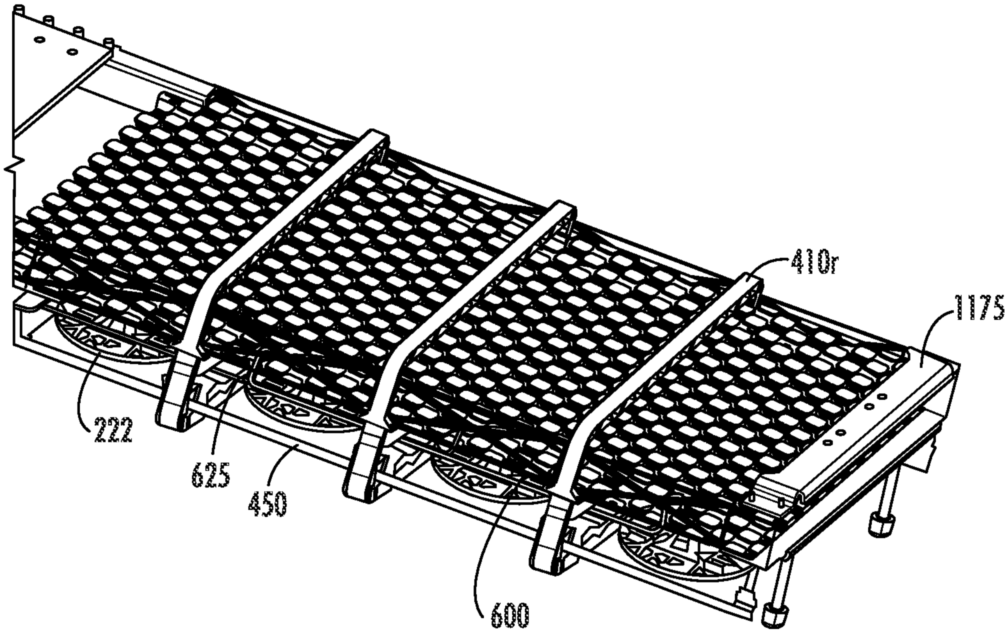

FIGS. 17A and 18A show a partially assembled view of the internal components with the struts 400, 600 aligned for assembly and the back arms 410*r* pre-attached to some longitudinally extending struts 600. FIGS. 18A, 18B show the struts 400, 600 fully assembled.

The grid reflector 170*g*, such as either of the first and second grid reflectors 1170, 1172 can define at least one frequency selective surface ("FSS"). The grid can have a grid pattern. In some embodiments, the grid reflector 1170, 1172 be mounted on a suitable substrate such as, for example, a printed circuit board, PC and/or SMC. In some embodiments, the grid pattern is provided by metallic patches in one or more layers over and/or behind one or more dielectric layers, which may be provided by a multiple layer printed circuit board. The grid reflector 1170, 1172 can provide the grid pattern(s) in sheet metal as will be discussed further below.

The grid reflectors 1170, 1172 can be configured to allow high band radiating elements (typically located in the active antenna module 110) to propagate electromagnetic waves therethrough and to reflect lower band RF signals (lower band electromagnetic waves) from lower band radiating elements projecting forward of the grid reflectors 1170, 1172.

As discussed above, the grid reflector 170*g*, 1170, 1172 defining at least one FSS can be provided by any suitable material(s) such as, for example, a printed circuit board with a metal grid pattern of metal patches, a non-metallic substrate comprising a metallized surface in a grid pattern or a sheet or sheets of metal provided with a grid pattern.

The grid pattern can be arranged in any suitable manner and may be symmetric or asymmetric across a width and/or length of the grid reflector. Unit cells of the grid pattern may be the same across and along the grid reflector or may have different shapes and/or sizes.

The grid reflector 170*g*, 1170, 1172 providing the FSS can comprise, in some embodiments, metamaterial, a suitable RF material or even air (although air may require a more complex assembly). The term "metamaterial" refers to composite electromagnetic (EM) materials. Metamaterials may comprise sub-wavelength periodic microstructures.

The grid reflector 170*g*, 1170, 1172 can be configured to allow RF energy (electromagnetic waves) to pass through at one or more first defined frequency band and that is configured to reflect RF energy at a different second frequency band. Thus, the grid reflectors 1170, 1172 can reside behind at least some antenna elements of the passive antenna assembly 190 and can selectively reject some frequency bands and permit other frequency bands such as those of the antenna elements of the active antenna 1190 to pass therethrough by including the FSS to operate as a type of "spatial filter".

A discussion of some example FSSs can be found in Ben A. Munk, Frequency Selective Surfaces: Theory and Design, ISBN: 978-0-471-37047-5; DOI: 10.1002/0471723770; April 2000, Copyright© 2000 John Wiley & Sons, Inc., the contents of which are hereby incorporated by reference as if recited in full herein. See also, co-pending U.S. patent application Ser. No. 17/468,783, the contents of which are also incorporated by reference as if recited in full herein.

In some embodiments, the grid reflector defining the FSS can be configured to act like a High Pass Filter essentially allowing mid band and/or low band energy <2.7 MHz, to substantially reflect (the FSS can act like a sheet of metal) while allowing higher band energy, for example, about 3.5 GHz or greater, to substantially pass through. Thus, the FSS is transparent or invisible to the higher band energy and a suitable out of band rejection response from the FSS can be achieved. The FSS may allow a reduction in filters or even eliminate filter requirements for looking back into the radio 1120.

In some embodiments, the grid reflector 170*g*, 1170 and/or 1172 may be implemented by forming the frequency selective surface on a printed circuit board, optionally a flex circuit board. In some embodiments, a multi-layer printed circuit board can comprise one or more layers which form the FSS configured such that electromagnetic waves within a predetermined frequency range cannot propagate therethrough and one or more other predetermined frequency range associated with the one or more layers of the multi-layer printed circuit board is allowed to pass therethrough. The grid pattern of the grid reflector can comprise shaped metal patches of any suitable geometry.

In some embodiments, the grid reflector 170*g*, 1170, 1172 is provided by a sheet or sheets of metal that is/are stamped, punched, acid etched, or otherwise formed to provide a grid pattern. The grid pattern can be configured to have closed or open unit cells of any suitable geometry.

The grid reflector 170*g*, 1170, 1172 can be provided as a single layer of sheet metal providing the grid pattern with the unit cells and with the open centers or interiors devoid of metal. For further discussion of metal grids, see U.S. Provisional Application Ser. No. 63/254,446 and/or any related applications claiming priority thereto, the contents of which are hereby incorporated by reference as if recited in full herein.

The passive antenna assembly 190 comprises multiple arrays of radiating elements, typically provided in columns, with radiating elements that extend forwardly from the primary reflector 214, with some columns of radiating elements continuing to extend in front of the front side of the grid reflector 170*g*. The arrays of radiating elements of the antenna assembly 190 may comprise radiating elements 222 that are configured to operate in a first frequency band and radiating elements 232 that are configured to operate in a second frequency band. Other arrays of radiating elements may comprise radiating elements that are configured to operate in either the second frequency band or in a third frequency band. The first, second and third frequency bands may be different frequency bands (although potentially overlapping). In some embodiments, low band radiating elements 222 that are configured to operate in some or all of the 617-960 MHz frequency band) can reside in front of and along right and left side portions 170*r*, 170*l* of the reflector 170 and/or right and left sides of the primary reflector 214.

Some of the radiating elements of the antenna 100 may be mounted to extend forwardly from the primary reflector 214, and, if dipole-based radiating elements are used, the dipole radiators of these radiating elements may be mounted approximately ¼ of a wavelength of the operating frequency for each radiating element forwardly of the main reflector 214. The main reflector 214 may serve as a reflector and as a ground plane for the radiating elements of the base station antenna 100 that are mounted thereon.

The passive antenna assembly 190 of the base station antenna 100 can include one or more arrays 220 of low-band radiating elements 222, one or more arrays of first mid-band radiating elements, one or more arrays of second mid-band radiating elements and optionally one or more arrays of high-band radiating elements. The radiating elements may each be dual-polarized radiating elements. Further details of radiating elements can be found in co-pending WO2019/236203 and WO2020/072880, the contents of which are hereby incorporated by reference as if recited in full herein. Some of the high band radiating elements, such as radiating elements 1195, can be provided as a mMIMO antenna array and may be provided in the active antenna module 110.

Referring to FIGS. 2 and 3A, the low-band radiating elements 222 can be mounted to extend forwardly from the main or primary reflector 214 and left and right sides of the grid reflector 170*g* and can be mounted in two columns to form two linear arrays 220 of low-band radiating elements 222. Each low-band linear array 220 may extend along substantially the full length of the antenna 100 in some embodiments.

The low-band radiating elements 222 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The low-band linear arrays 220 may or may not be used to transmit and receive signals in the same portion of the first frequency band. For example, in one embodiment, the low-band radiating elements 222 in a first linear array 220 may be used to transmit and receive signals in the 700 MHz frequency band and the low-band radiating elements 222 in a second linear array 220 may be used to transmit and receive signals in the 800 MHz frequency band. In other embodiments, the low-band radiating elements 222 in both the first and second linear arrays may be used to transmit and receive signals in the 700 MHz (or 800 MHz) frequency band (e.g., to support 4×MIMO operation).

The linear arrays of first mid-band radiating elements may extend along the respective sides of the grid reflector 170*g* and/or the main reflector 214. The first mid-band radiating elements may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). In the depicted embodiment, the first mid-band radiating elements are configured to transmit and receive signals in the lower portion of the second frequency band (e.g., some or all of the 1427-2200 MHz frequency band). The linear arrays of first mid-band radiating elements may be configured to transmit and receive signals in the same portion of the second frequency band or in different portions of the second frequency band.

The second mid-band radiating elements can be mounted in columns to form linear arrays of second mid-band radiating elements. The second mid-band radiating elements may be configured to transmit and receive signals in the second frequency band. In the depicted embodiment, the second mid-band radiating elements are configured to transmit and receive signals in an upper portion of the second frequency band (e.g., some, or all, of the 2300-2700 MHz frequency band). In the depicted embodiment, the second mid-band radiating elements may have a different design than the first mid-band radiating elements 232.

The high-band radiating elements can be mounted in columns in the upper medial or center portion of antenna 100 to form a multi-column (e.g., four or eight column) array of high-band radiating elements. The high-band radiating elements may be configured to transmit and receive signals in a third frequency band. In some embodiments, the third frequency band may comprise the 3300-4200 MHz frequency range or a portion thereof.

In the depicted embodiment, the arrays of low-band radiating elements, the arrays of first mid-band radiating elements, and the arrays of second mid-band radiating elements are all part of the passive antenna assembly 190, while the array of high-band radiating elements 1195 are part of the active antenna module 110. It will be appreciated that the types of arrays included in the passive antenna assembly 190, and/or the active antenna module 110 may be varied in other embodiments.

It will also be appreciated that the number of linear arrays of low-band, mid-band and high-band radiating elements may be varied from what is shown in the figures. For example, the number of linear arrays of each type of radiating elements may be varied from what is shown, some types of linear arrays may be omitted and/or other types of arrays may be added, the number of radiating elements per array may be varied from what is shown, and/or the arrays may be arranged differently. As one specific example, two linear arrays of second mid-band radiating elements may be replaced with four linear arrays of ultra-high-band radiating elements that transmit and receive signals in a 5 GHz frequency band.

Each array 220 of low-band radiating elements 222 may be used to form a pair of antenna beams, namely an antenna beam for each of the two polarizations at which the dual-polarized radiating elements are designed to transmit and receive RF signals. Likewise, each array of first mid-band radiating elements, and each array of second mid-band radiating elements may be configured to form a pair of antenna beams, namely an antenna beam for each of the two polarizations at which the dual-polarized radiating elements are designed to transmit and receive RF signals. Each linear array may be configured to provide service to a sector of a base station. For example, each linear array may be configured to provide coverage to approximately 120° in the azimuth plane so that the base station antenna 100 may act as a sector antenna for a three-sector base station. Of course, it will be appreciated that the linear arrays may be configured to provide coverage over different azimuth beamwidths. While all of the radiating elements can be dual-polarized radiating elements in the depicted embodiments, it will be appreciated that in other embodiments some or all of the dual-polarized radiating elements may be replaced with single-polarized radiating elements. It will also be appreciated that while the radiating elements are illustrated as dipole radiating elements in the depicted embodiment, other types of radiating elements such as, for example, patch radiating elements may be used in other embodiments.

RF connectors or "ports" 140 (FIG. 1) can be mounted in the bottom end cap 130 that are used to couple RF signals from external remote radio units (not shown) to the arrays of the passive antenna assembly 190. Two RF ports can be provided for each array, namely a first RF port 140 that couples first polarization RF signals between the remote radio unit and the arrays and a second RF port 140 that couples second polarization RF signals between the remote radio unit and the arrays. As the radiating elements can be slant cross-dipole radiating elements, the first and second polarizations may be a −45° polarization and a +45° polarization.

A phase shifter may be connected to a respective one of the RF ports 140. The phase shifters may be implemented as, for example, wiper arc phase shifters such as the phase shifters disclosed in U.S. Pat. No. 7,907,096 to Timofeev, the disclosure of which is hereby incorporated herein in its entirety. A mechanical linkage may be coupled to a RET actuator (not shown). The RET actuator may apply a force to the mechanical linkage which in turn adjusts a moveable element on the phase shifter in order to electronically adjust the downtilt angles of antenna beams that are generated by the one or more of the low-band or mid-band linear arrays.

It should be noted that a multi-connector RF port (also referred to as a "cluster" connector) can be used as opposed to individual RF ports 140. Suitable cluster connectors are disclosed in U.S. patent application Ser. No. 16/375,530, filed Apr. 4, 2019, the entire content of which is incorporated herein by reference.

The radiating elements 220 can be dipole elements configured to operate in some or all the 617-960 MHz frequency band. Further discussions of example antenna elements including antenna elements comprising feed stalks can be found in U.S. Provisional Patent Application Ser. Nos. 63/087,451 and 62/993,925 and/or related utility patent applications claiming priority thereto, the contents of which are hereby incorporated by reference as if recited in full herein.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.)

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The term "about" used with respect to a number refers to a variation of +/−10%.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a base station antenna housing comprising a front radome and a rear;

a passive antenna assembly in the base station antenna housing;

a plurality of laterally extending struts that are longitudinally spaced apart inside the base station antenna housing, wherein at least some of the plurality of laterally extending struts comprise a forward arm extending laterally across the base station antenna; and at least one reflector coupled to the forward arm, wherein the at least some of the plurality of laterally extending struts each further comprises a rearward arm that extends laterally across the base station antenna and that is parallel to and resides behind the forward arm, with one or more of the at least one reflector positioned between the forward arm and the rearward arm.

2. The base station antenna of claim 1, further comprising parasitic elements coupled to at least some of the plurality of laterally extending struts.

3. The base station antenna of claim 2, wherein the parasitic elements are coupled to the forward arms.

4. The base station antenna of claim 1, wherein the at least one reflector comprises at least one grid reflector.

5. The base station antenna of claim 1, wherein the at least one reflector comprises first and second grid reflectors, stacked in a front to back direction, and wherein the rearward arm comprises right and left side cooperating laterally inwardly extending grooves that receive a portion of the second grid reflector.

6. The base station antenna of claim 1, wherein the rearward arm comprises forwardly projecting members that are laterally spaced apart.

7. The base station antenna of claim 6, wherein the at least one reflector comprises first and second grid reflectors, stacked in a front to back direction, wherein the base station antenna further comprises a plurality of standoffs extending between the first and second grid reflectors.

8. The base station antenna of claim 1, further comprising an active antenna unit residing behind and/or coupled to a rear of the base station antenna housing.

9. The base station antenna of claim 1, wherein the at least one reflector comprises at least one grid reflector defining at least one frequency selective surface (FSS) that is configured to reflect or block electromagnetic waves from radiating elements of the passive antenna assembly and allow higher band electromagnetic waves to travel therethrough toward the front radome.

10. The base station antenna of claim 9, further comprising an active antenna unit residing behind and/or coupled to the base station antenna housing, wherein the active antenna unit comprises an array of radiating elements facing the at least one grid reflector, and wherein the array of radiating elements of the active antenna unit are configured to propagate RF energy through the at least one grid reflector.

11. The base station antenna of claim 1, wherein the at least one reflector is a grid reflector configured to allow RF energy to pass through at one or more defined frequency range and reflect RF energy at a different frequency band.

12. A base station antenna, comprising:

a base station antenna housing comprising a front radome and a rear;

a passive antenna assembly in the base station antenna housing;

a plurality of laterally extending struts that are longitudinally spaced apart inside the base station antenna housing, wherein at least some of the plurality of laterally extending struts comprise a forward arm extending laterally across the base station antenna;

at least one reflector coupled to the forward arm; and a plurality of longitudinally extending struts coupled to rearwardly extending left and right-side portions of the forward arm of at least some of the plurality of laterally extending struts with the at least one reflector positioned therebetween.

13. The base station antenna of claim 12, wherein at least some of the plurality of longitudinally extending struts comprise cable fastener features that are configured to accept cable ties, and wherein cables are captured by the cable ties secured to the cable fastener features whereby the cables are routed along a longitudinally extending outer perimeter of at least some of the at least one reflector.

14. The base station antenna of claim 12, wherein the laterally extending struts and the longitudinally extending struts are non-metallic with a low dielectric constant material.

15. A base station antenna, comprising:

a base station antenna housing comprising a front radome and a rear;

a passive antenna assembly in the base station antenna housing;

a plurality of laterally extending struts that are longitudinally spaced apart inside the base station antenna housing, wherein at least some of the plurality of laterally extending struts comprise a forward arm extending laterally across the base station antenna; and first and second grid reflectors, stacked in a front to back direction, wherein the base station antenna further comprises a plurality of longitudinally extending struts coupled to rearwardly extending left and right-side portions of the forward arm of the at least some of the plurality of laterally extending struts, and wherein the first and second grid reflectors are positioned between the left and right-side portions of the forward arm of the at least some of the plurality of laterally extending struts.

16. The base station antenna of claim 15, wherein the at least one reflector comprises right and left side wall segments that extend rearwardly and that merge into a respective inwardly extending lip, and wherein the lip is coupled to a laterally extending brace and to a top end portion of the second grid reflector.

17. A base station antenna, comprising:

a base station antenna housing comprising a front radome and a rear;

a passive antenna assembly in the base station antenna housing;

a plurality of laterally extending struts that are longitudinally spaced apart inside the base station antenna housing, wherein at least some of the plurality of laterally extending struts comprise a forward arm extending laterally across the base station antenna; and first and second grid reflectors, stacked in a front to back direction, wherein at least some of the plurality of laterally extending struts further comprise a rearward arm that is parallel to and resides behind the forward arm, and wherein the first grid reflector is coupled to the forward arm and the second grid reflector is held by the rearward arm.

18. A base station antenna, comprising:

a base station antenna housing comprising a front radome and a rear;

a passive antenna assembly in the base station antenna housing;

a plurality of laterally extending struts that are longitudinally spaced apart inside the base station antenna housing, wherein at least some of the plurality of laterally extending struts comprise a forward arm extending laterally across the base station antenna; and at least one reflector coupled to the forward arm of the plurality of struts, wherein the at least one reflector comprises first and second grid reflectors, stacked in a front to back direction, wherein the base station antenna further comprises at least one longitudinally extending strut coupled to each of left and right-side wall segments of the first grid reflector, and wherein the at least one longitudinally extending strut defines an inwardly and longitudinally extending groove that holds a segment of the second grid reflector.

19. A base station antenna, comprising:

a base station antenna housing comprising a front radome and a rear;

a passive antenna assembly in the base station antenna housing;

a plurality of laterally extending struts that are longitudinally spaced apart inside the base station antenna housing, wherein at least some of the plurality of laterally extending struts comprise a forward arm extending laterally across the base station antenna; and at least one reflector coupled to the forward arm of the at least some of the plurality of laterally extending struts, wherein the forward arm is attached to a rearward arm that is parallel to and resides behind the forward arm, wherein the at least one reflector comprises a first reflector that is sandwiched between right and left side walls in an open space defined by aligned pairs of the forward and rearward arms, and wherein the first reflector has rearwardly extending right and left side wall segments that couple to right and left side longitudinally extending struts.

20. A base station antenna, comprising:

a base station antenna housing comprising a front radome and a rear;

a passive antenna assembly in the base station antenna housing;

a plurality of laterally extending struts that are longitudinally spaced apart inside the base station antenna housing, wherein at least some of the plurality of laterally extending struts comprise a forward arm extending laterally across the base station antenna;

at least one reflector coupled to the forward arm of the plurality of struts; and at least one right side and at least one left side longitudinally extending strut, each comprising a closed perimeter with an interior X shaped structure extending longitudinally between opposing end portions of the closed perimeter to thereby define a box shape structure.

* * * * *